(12) United States Patent
Bly et al.

(10) Patent No.: US 8,191,940 B2
(45) Date of Patent: Jun. 5, 2012

(54) LATCHING MOTION TRANSFER MECHANISM

(75) Inventors: Robert R. Bly, Wellington, OH (US); Kevin S. Wysocki, Grafton, OH (US); Michael A. Gregory, Fairlawn, OH (US)

(73) Assignee: Invacare Corp., Elyria, OH (US)

( * ) Notice: Subject to any disclaimer, the term of this patent is extended or adjusted under 35 U.S.C. 154(b) by 681 days.

(21) Appl. No.: 12/246,634

(22) Filed: Oct. 7, 2008

(65) Prior Publication Data
US 2009/0100598 A1 Apr. 23, 2009

Related U.S. Application Data

(60) Provisional application No. 60/980,476, filed on Oct. 17, 2007.

(51) Int. Cl.
*E05C 1/08* (2006.01)
*E05C 9/12* (2006.01)

(52) U.S. Cl. ............... 292/163; 292/1; 292/56; 292/63; 292/332; 292/DIG. 4

(58) Field of Classification Search .......... 292/1, 56–69, 292/163, 219, 332, DIG. 4
See application file for complete search history.

(56) References Cited

U.S. PATENT DOCUMENTS

| | | | | |
|---|---|---|---|---|
| 756,453 | A * | 4/1904 | Arens et al. | 292/163 |
| 780,417 | A * | 1/1905 | Euphrat | 292/19 |
| 3,918,752 | A * | 11/1975 | Leone et al. | 292/174 |
| 4,482,175 | A * | 11/1984 | Sugie | 292/45 |
| 4,917,416 | A * | 4/1990 | Westphal et al. | 292/175 |
| 5,984,381 | A * | 11/1999 | Yamagishi | 292/45 |
| 6,588,809 | B1 * | 7/2003 | Derman | 292/129 |
| 6,981,538 | B2 * | 1/2006 | English | 160/7 |
| 7,503,722 | B2 * | 3/2009 | Chou | 403/325 |
| 7,766,407 | B2 * | 8/2010 | Nakaya | 296/24.34 |
| 7,793,995 | B2 * | 9/2010 | King et al. | 292/332 |
| 2007/0080030 | A1 | 4/2007 | Kramer | |

* cited by examiner

*Primary Examiner* — Carlos Lugo
(74) *Attorney, Agent, or Firm* — Calfee, Halter & Griswold, LLP

(57) ABSTRACT

Latching motion transfer arrangements may be used to raise an object up and out of engagement with the ground or other support surface and to lower the object back onto the ground or other support surface. In one exemplary embodiment, the mechanism is caused to lift and latch by applying force in a first direction, a first time, and is caused to release and lower by applying force in the first direction, a second time.

24 Claims, 34 Drawing Sheets

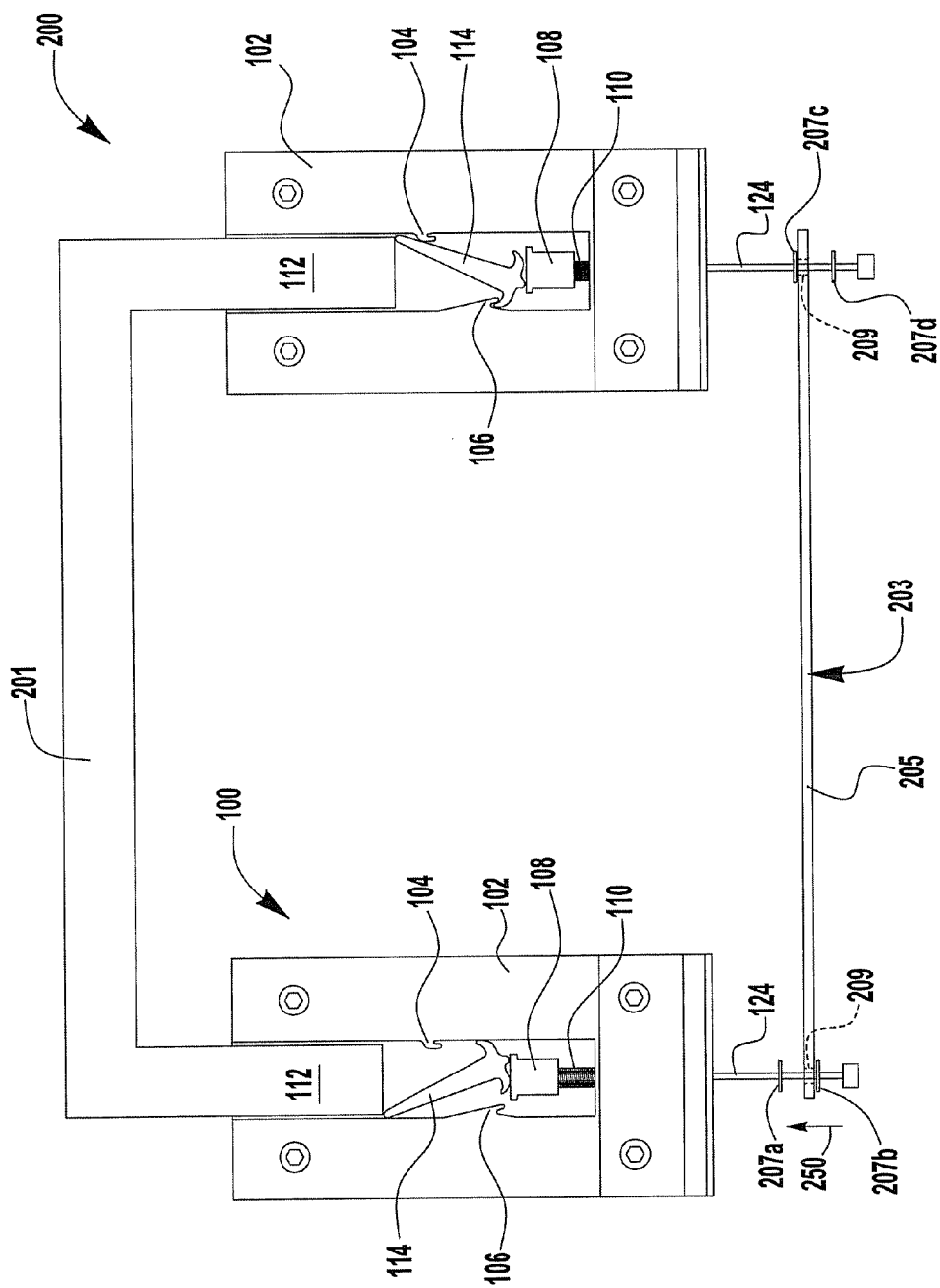

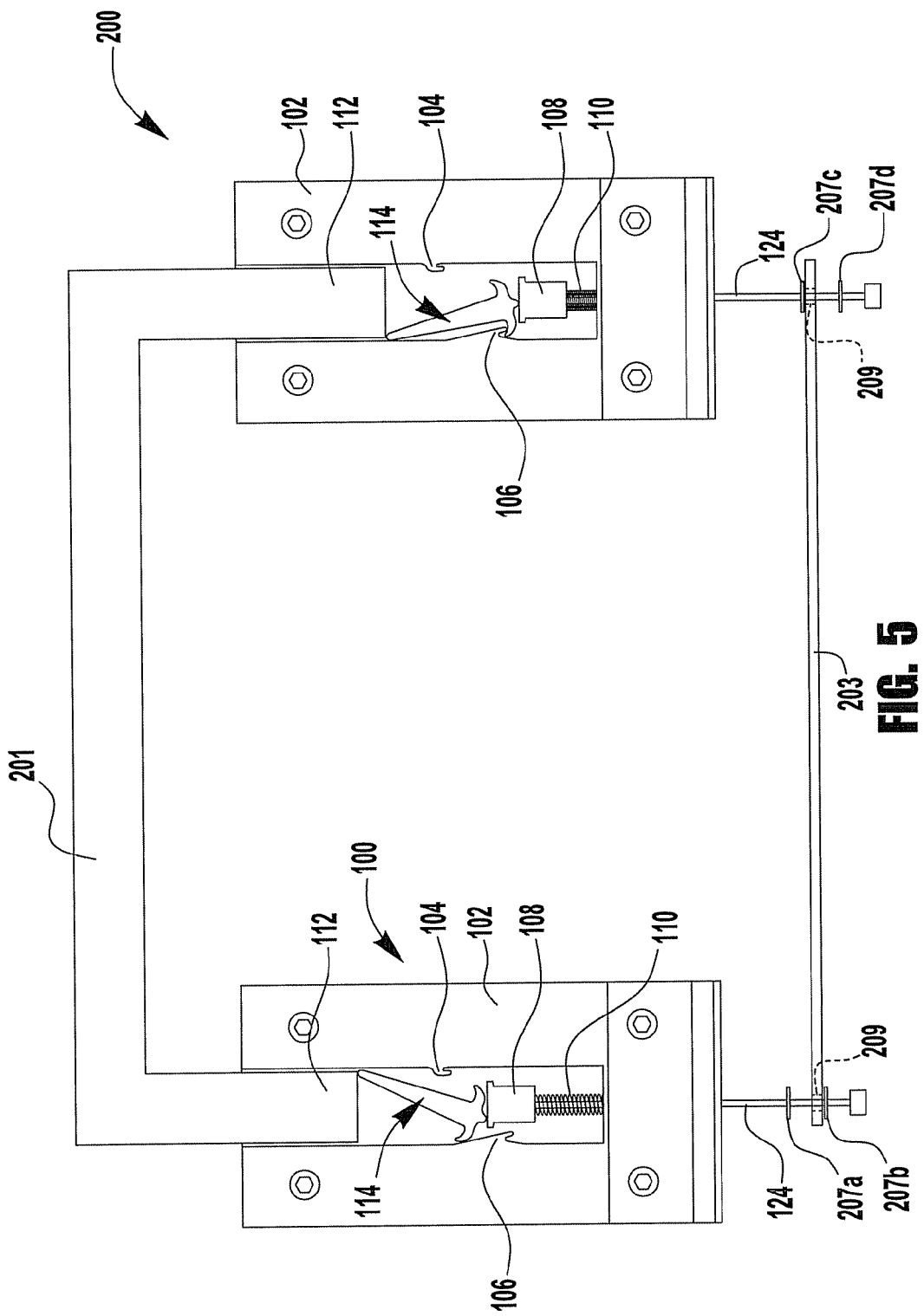

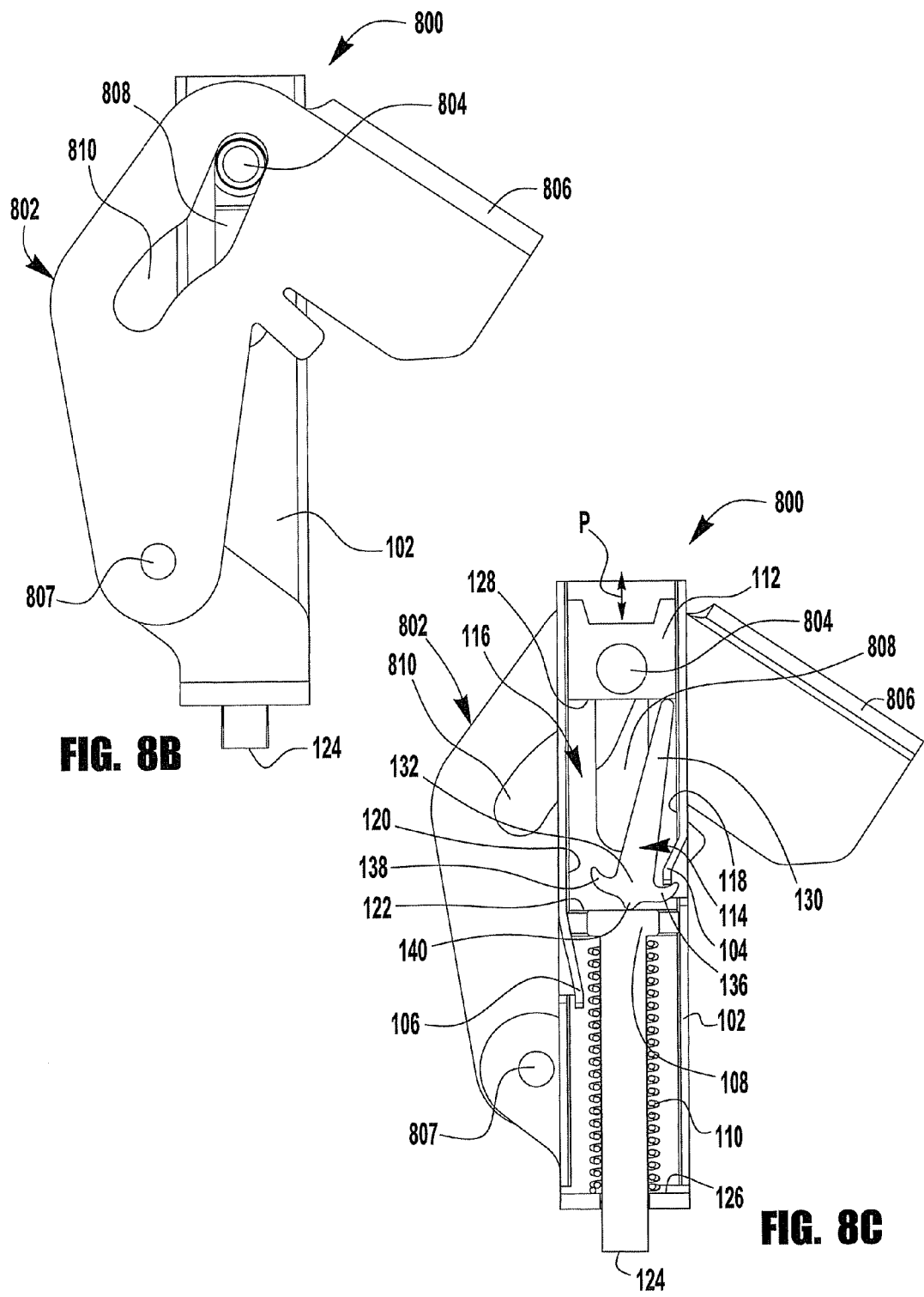

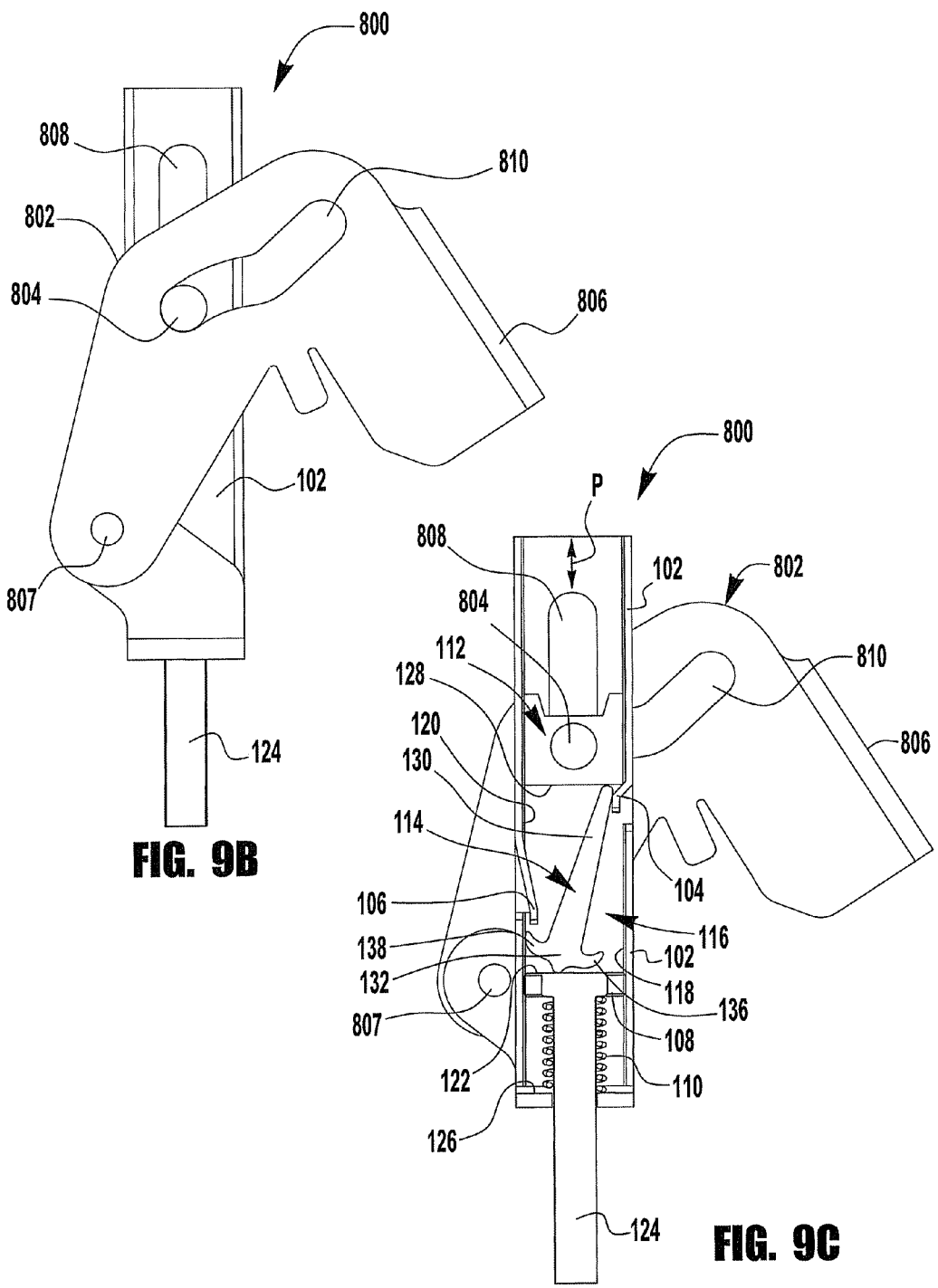

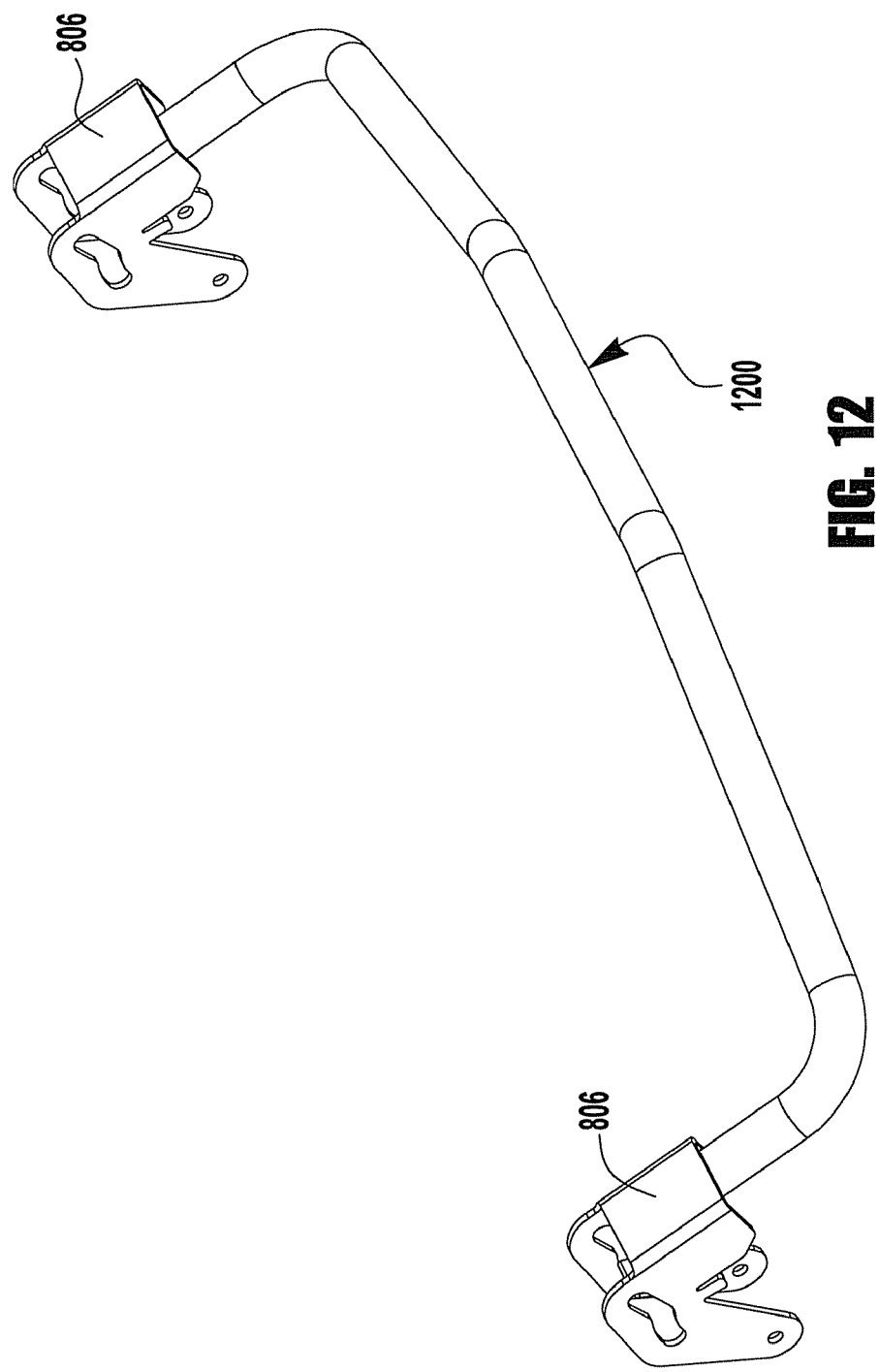

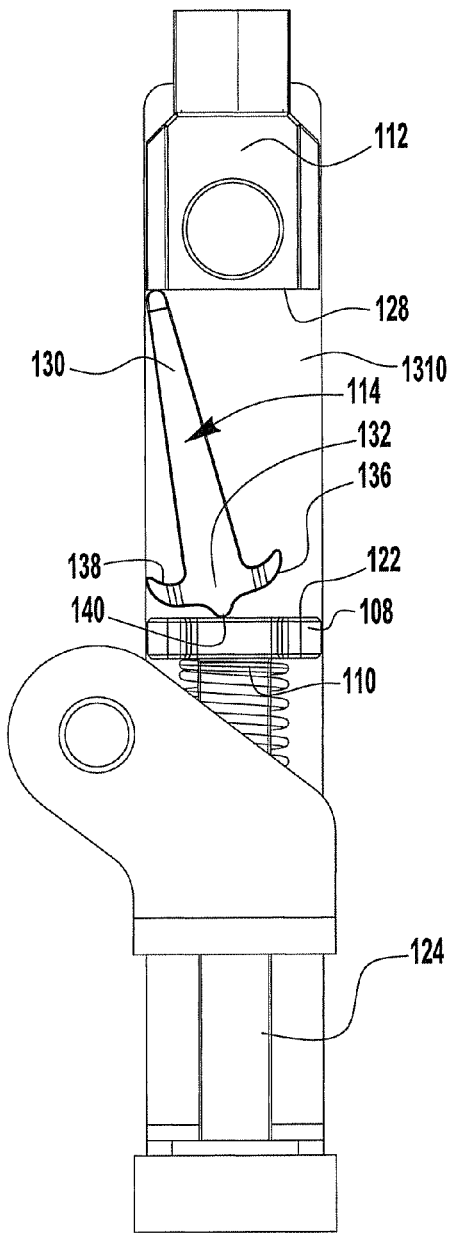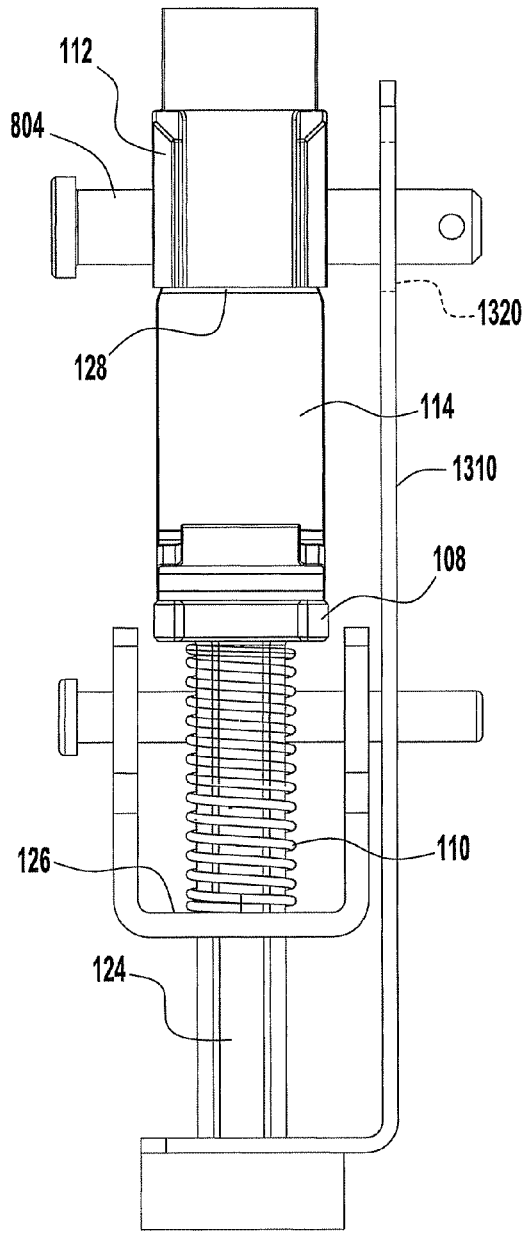
FIG. 13E   FIG. 13F

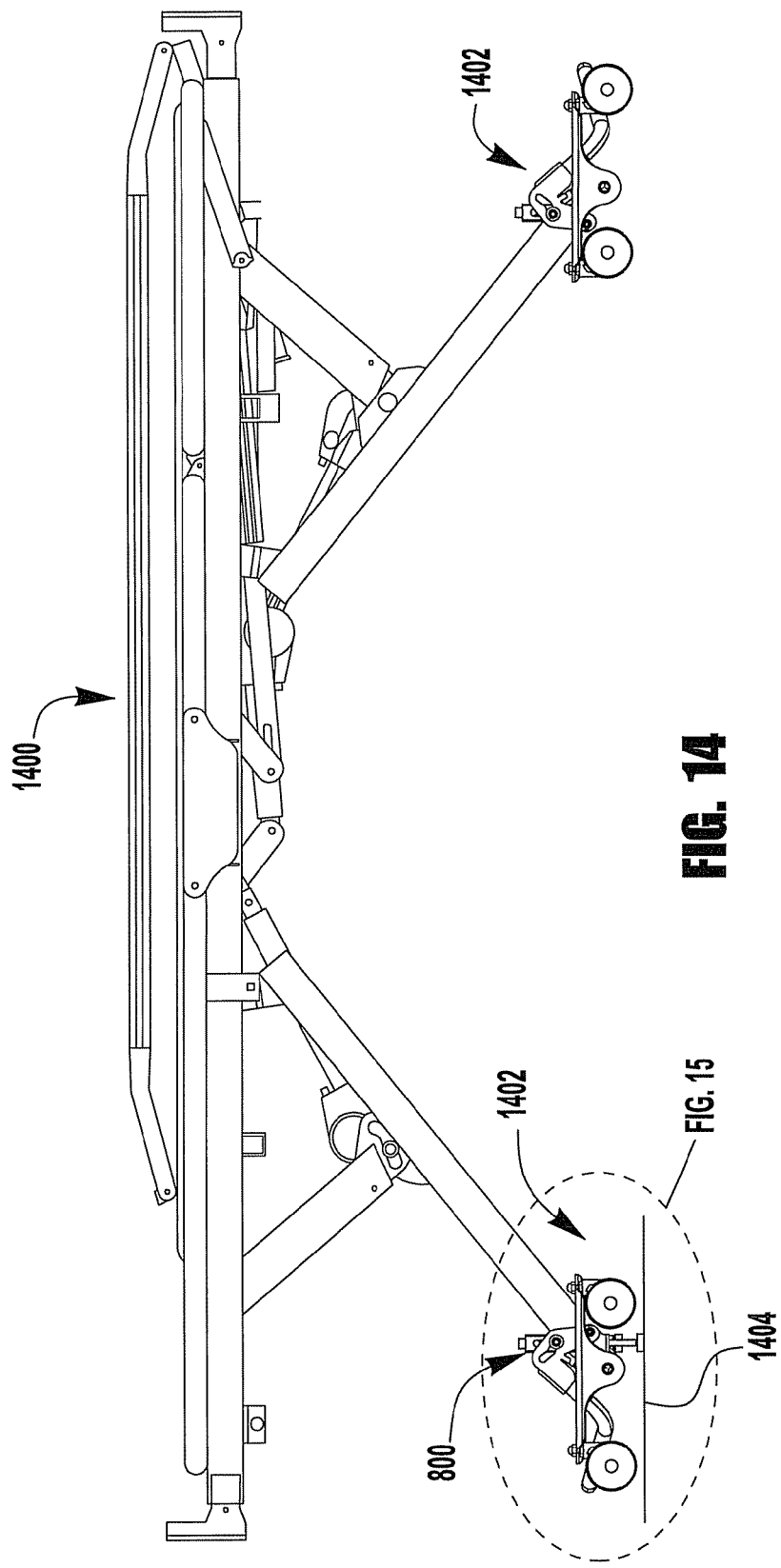

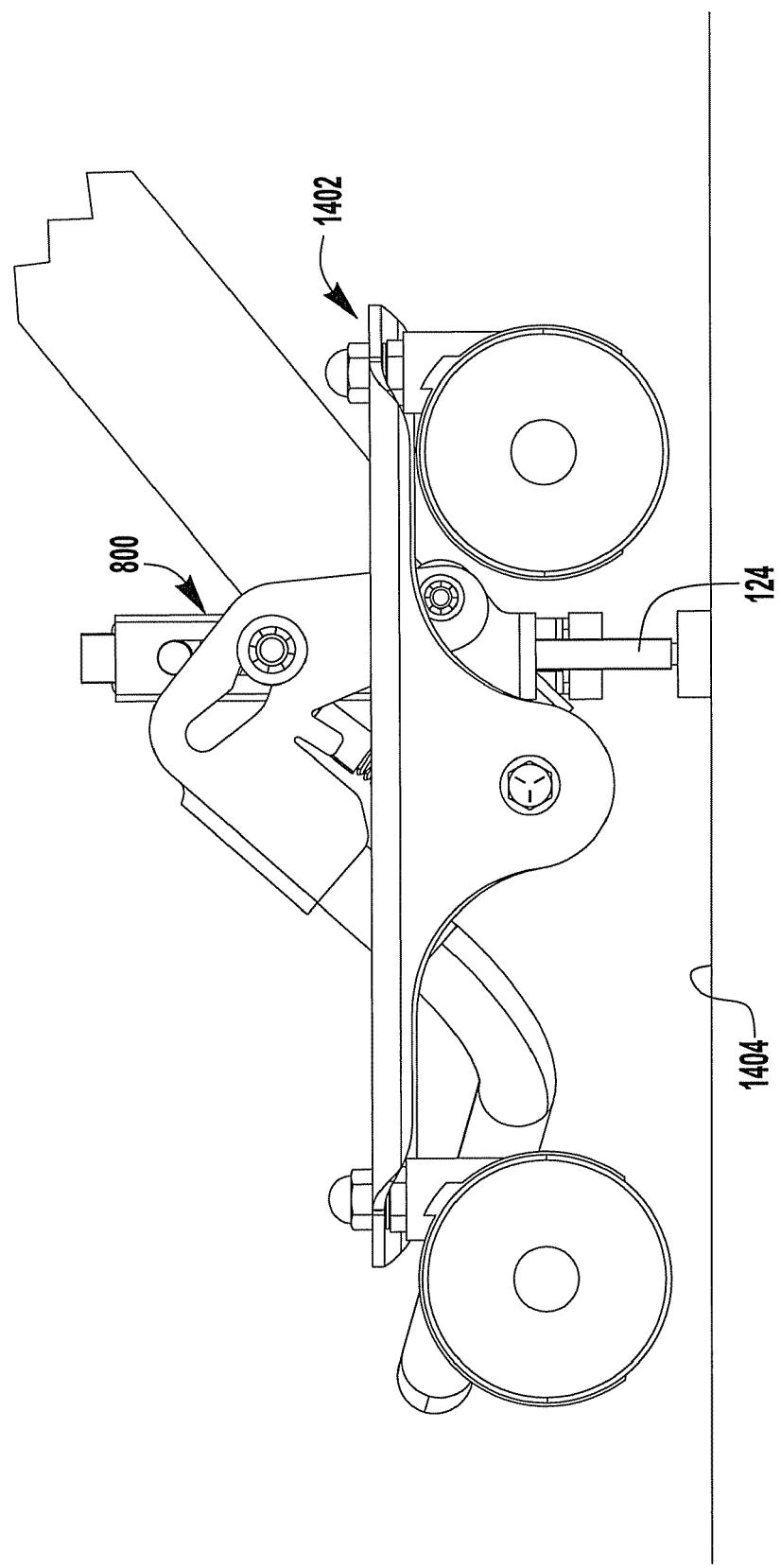

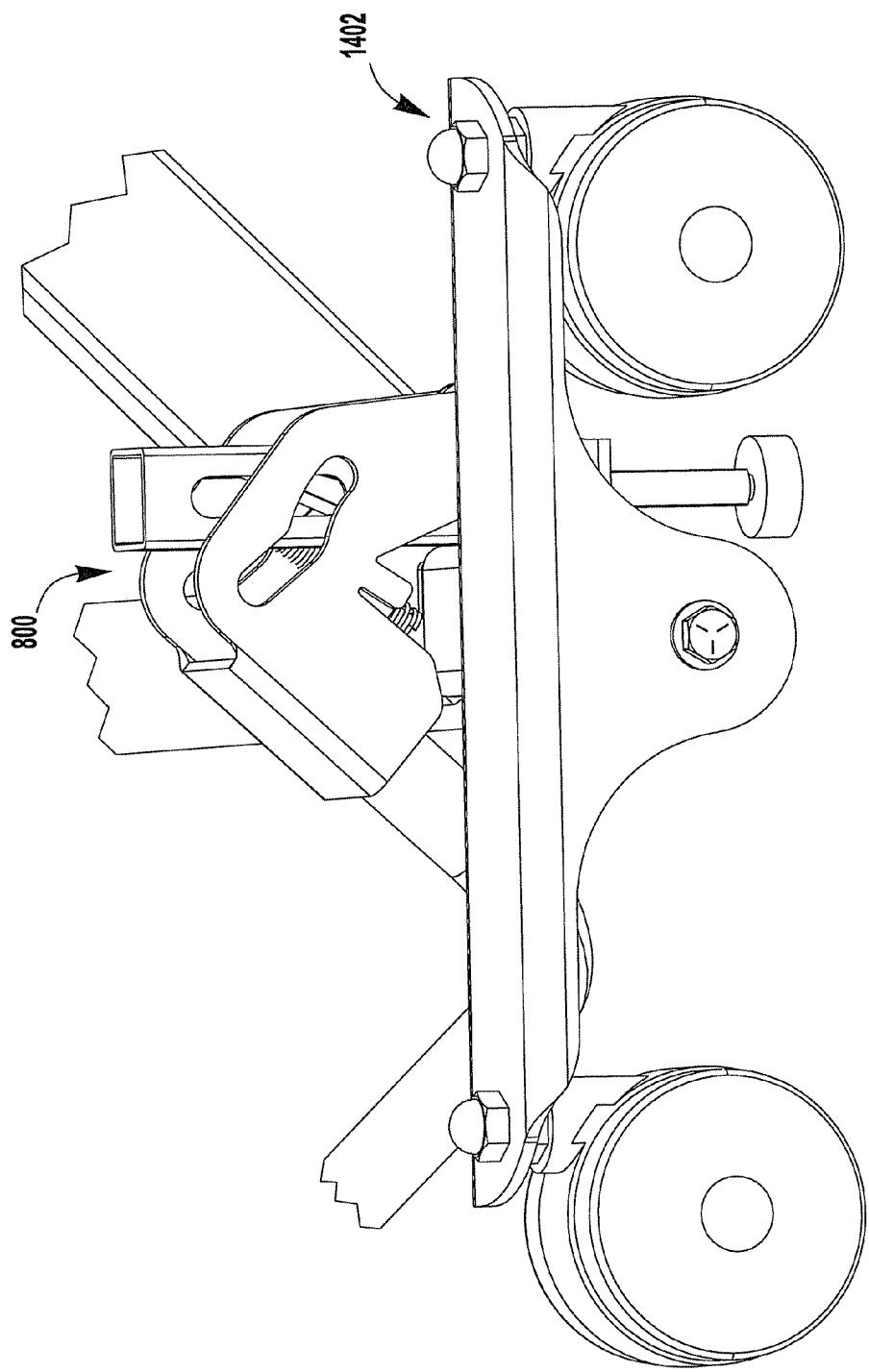

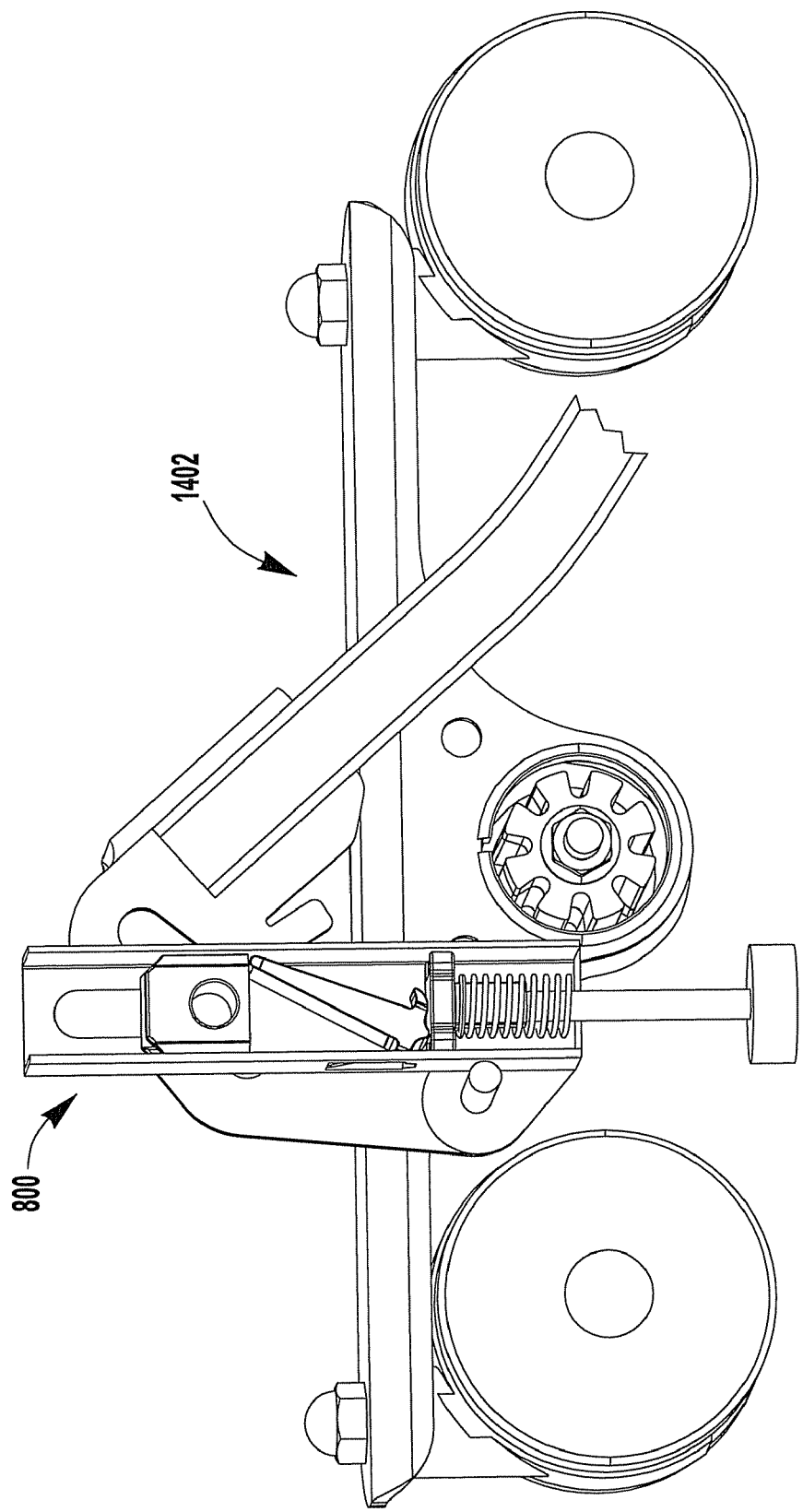

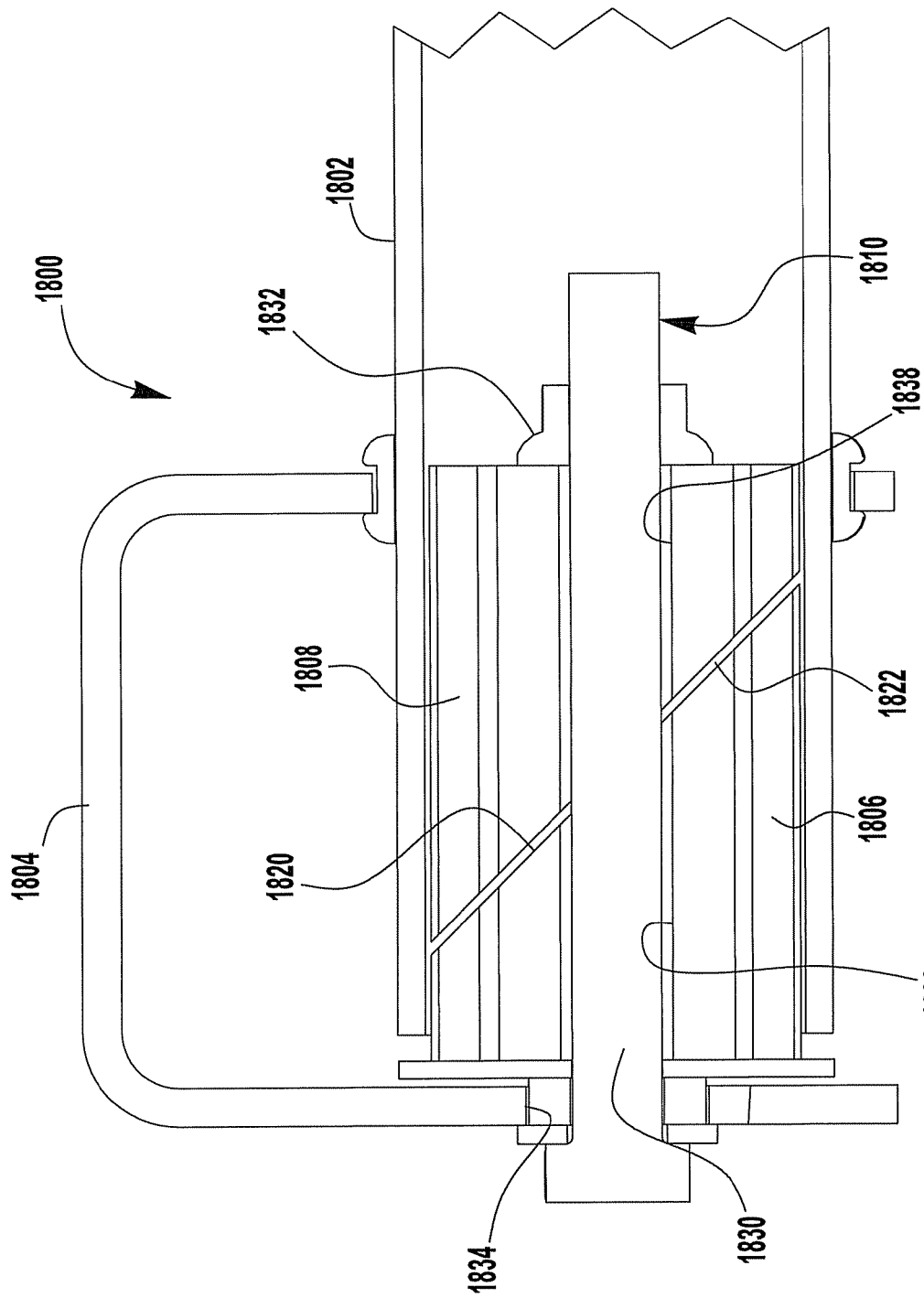

LATCHING MOTION TRANSFER MECHANISM

RELATED APPLICATIONS

The present application claims the benefit of U.S. provisional application Ser. No. 60/980,476, filed on Oct. 17, 2007.

BACKGROUND

Motion transfer arrangements are used in a wide variety of different applications. Motion transfer mechanisms have been used as "brakes" for articulating beds that are supported by casters. Moving a lift pedal of a brake assembly causes the brake assembly to engage the ground or other support surface to raise the caster (s) up and out of engagement with the ground or other support surface. Moving a second, disengagement pedal, causes the brake assembly to lower the casters back onto the support surface to allow the articulating bed to be moved on the support surface.

SUMMARY

The present application discloses exemplary embodiments of latching motion transfer arrangements. In one exemplary embodiment, the mechanism is caused to lift and latch by applying force in a first direction, a first time, and is caused to release and lower by applying force in the first direction, a second time.

DESCRIPTION OF THE FIGURES

FIG. 3 shows the embodiment of FIG. 2 where the detent member of one of the motion transfer members has disengaged from the extended position, while the detent member of the other motion transfer member remains engaged at the extended position;

FIG. 5 shows the embodiment of FIG. 3 where the detent member of one of the motion transfer members has failed to engage at the extended position, while the detent member of the other motion transfer member has engaged at the extended position;

FIG. 8B is a side view of the latching motion transfer mechanism of FIG. 8A;

FIG. 8C is a sectional view of the latching motion transfer mechanism of FIG. 8A;

FIG. 9B is a side view of the latching motion transfer mechanism of FIG. 9A;

FIG. 9C is a sectional view of the latching motion transfer mechanism of FIG. 9A;

FIG. 12 is a perspective view of an embodiment of a lever assembly for actuating a pair of latching motion transfer mechanisms;

FIG. 13E is a side view of the latching motion transfer mechanism of FIG. 13A with components removed to more clearly illustrate the synchronization arrangement;

FIG. 13F is a front view of the latching motion transfer mechanism of FIG. 13A with components removed to more clearly illustrate the synchronization arrangement;

FIG. 14 is a side view of an articulating bed with a caster assembly and a latching motion transfer mechanism used as a caster lock;

FIG. 15 is an enlarged portion of FIG. 14 as indicated by the reference FIG. 15 in FIG. 14;

FIG. 16 is a perspective view that is similar to the view of FIG. 15;

FIG. 17 is a perspective sectional view taken along lines 17-17 in FIG. 16;

FIG. 19 is a sectional view of the caster assembly mounting arrangement.

WRITTEN DESCRIPTION OF PREFERRED EMBODIMENTS

Figure 1A:
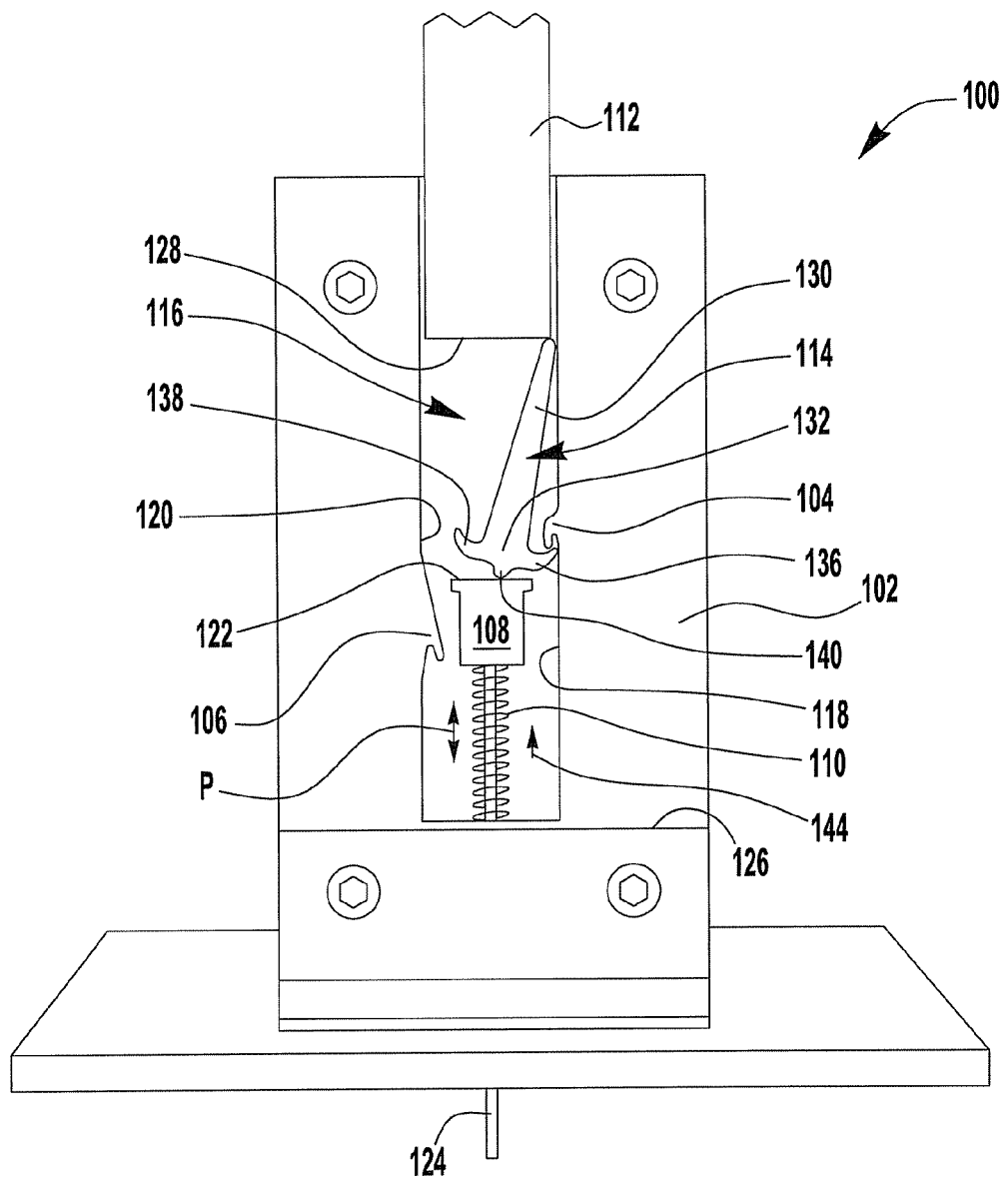
FIG. 1A illustrates a latching motion transfer mechanism of an exemplary embodiment with a detent member latched at a retracted position.

Referring to the Figures, the present application discloses embodiments of latching motion transfer arrangements. The latching motion transfer arrangements may take a wide variety of different forms and may be used in a wide variety of different applications. A variety of different features are included in the different latching motion transfer mechanism embodiments that are disclosed in this application. The scope of this application is intended to encompass all combinations and sub-combinations of the features of the latching motion transfer mechanisms disclosed in this application, as well as the wide variety of uses in different applications.

In one exemplary embodiment, a latching motion transfer arrangement is used as a lift mechanism. For example, the latching motion transfer mechanism may be used to lift a wheel or caster off of a support surface. The mechanism may take a wide variety of different forms. In an exemplary embodiment, the mechanism is caused to lift and latch by applying force in a first direction, a first time, and is caused to release and lower by applying force in the first direction, a second time. A wide variety of vehicles may include wheels and/or casters that may be lifted from the support surface by the mechanism, including but not limited to, beds supported by casters, wheelchairs, scooters, automobiles, etc.

FIG. 1A-1G illustrate an embodiment of a latching motion transfer mechanism 100. The illustrated latching motion transfer mechanism 100 includes a frame 102, a first catch 104, a second catch 106, a plunger 108, a biasing member 110, a drive member 112, and a detent member 114. The frame 102 includes a channel 116 with first and second spaced apart walls 118, 120. The channel may take a wide variety of different forms. In the illustrated embodiment, the channel 116 is straight. However, the channel may be curved, or the channel may have one or more straight and or curved portions or other configuration. The walls 118, 120 of the channel are illustrated as being parallel to one another. However, the walls 118, 120 may be non-parallel such that a spacing between the walls changes along the channel.

In the illustrated embodiment, the first catch 104 extends from the first side wall 118 into the channel 116 at a first position along a length of the channel. The second catch 106 extends from the second side wall 120 into the channel 116 at a second position along the length of the channel. The catches 104, 106 may take a wide variety of different forms. For example, either catch may be a portion of the channel wall that is bent into the channel, may be a projection that extends into the channel from the wall, may be a member that is attached to the channel wall, and/or may be a recess in the wall, instead of a projection that extends from the wall. Each catch may be any physical arrangement that is configured to latch with a second member.

The plunger 108 is disposed in the channel 116. The illustrated plunger 108 is a generally rectangular member having a detent member slide surface 122. The illustrated slide surface 122 may be generally transverse to a path of travel P formed by the channel 116. The plunger 108 may take a wide variety of different forms. Any configuration that is able to move along the path of travel P may be used. The slide surface 122 may be configured in any manner that allows the detent member 114 to slide and pivot within the channel 116.

The illustrated biasing member 110 is coupled to plunger 108 such that the plunger is urged along the path of travel P toward the first catch member 104. The biasing member 110 may take a wide variety of different forms and may be coupled to the plunger 108 in a wide variety of different ways. In the example illustrated by FIG. 1A-1G, the biasing member 110 is a spring disposed around a driven member 124 that is connected to the plunger 108. The biasing member 110 is disposed between the plunger 108 and an end wall of the frame 102. The biasing member may be any structure in any configuration that imparts a reaction force on the plunger toward the first catch member 104 when the plunger is moved in the channel toward an end wall 126 of the channel 116.

The drive member 112 is at least partially disposed in the channel 116 in the exemplary embodiment. The portion of the drive member 112 that is disposed in the channel is moveable long the path of travel P. The illustrated drive member 112 is a generally rectangular member having a detent member slide surface 128. The illustrated slide surface 128 is transverse to a path of travel P formed by the channel. The drive member may take a wide variety of different forms. Any configuration that is able to move along the path of travel P may be used. The slide surface 128 may be configured in any manner that allows a surface of the detent member 114 to slide between the side walls 116, 118 of the channel may be used.

The detent member 114 is disposed in the channel 116 between the drive member 112 and the plunger 108. The detent member 114 may take a wide variety of different forms. The detent member 114 may take any form that transfers motion of the drive member 112 to the plunger 108 and selectively latches and disengages from the first and second catches. The illustrated detent member 114 includes a leg portion 130 operably coupled with the drive member 112 and a latch portion 132 operably coupled with the plunger 108. The illustrated latch portion 132 has first and second latch projections 136, 138 extending generally from opposite sides of the leg portion. An optional pivot protrusion 140 extends from the latch portion 132 away from the leg portion 130. The latch portion 132 is configured to slide across the channel between the side walls 118, 120 such that the first latch projection 136 may latch with the first catch 104 and the second latch projection 138 may latch with the second catch 106. In the exemplary embodiment, the optional pivot protrusion 140 may be rounded to ease sliding of the latch portion 132 across the surface 122. An end of the leg portion 130 is moveable across the plunger surface 128 between the first and second walls 118, 120 of the channel to allow the latch portion 132 to disengage from said first and second catches 104, 106 when the drive member moves a second time in the direction toward the surface 126. In the illustrated embodiment, the upper end of the leg 130 is rounded to ease sliding of the leg 130 across the plunger slide surface 128 between the side walls 118, 120.

FIG. 1A-1G illustrate operation of the latching motion transfer mechanism 100. FIG. 1A illustrates the mechanism 100 latched at a retracted or first position. At this position, the first latch projection 136 is in engagement with the first catch 104. The biasing member 110 urges the first latch projection 136 against the first catch 104 to inhibit the first latch projection from disengaging from the first catch 104. The engagement of the first latch projection 136 with the first catch inhibits further movement of the plunger 108 and the driven member 124 in the direction indicated by arrow 144.

Figure 1B:
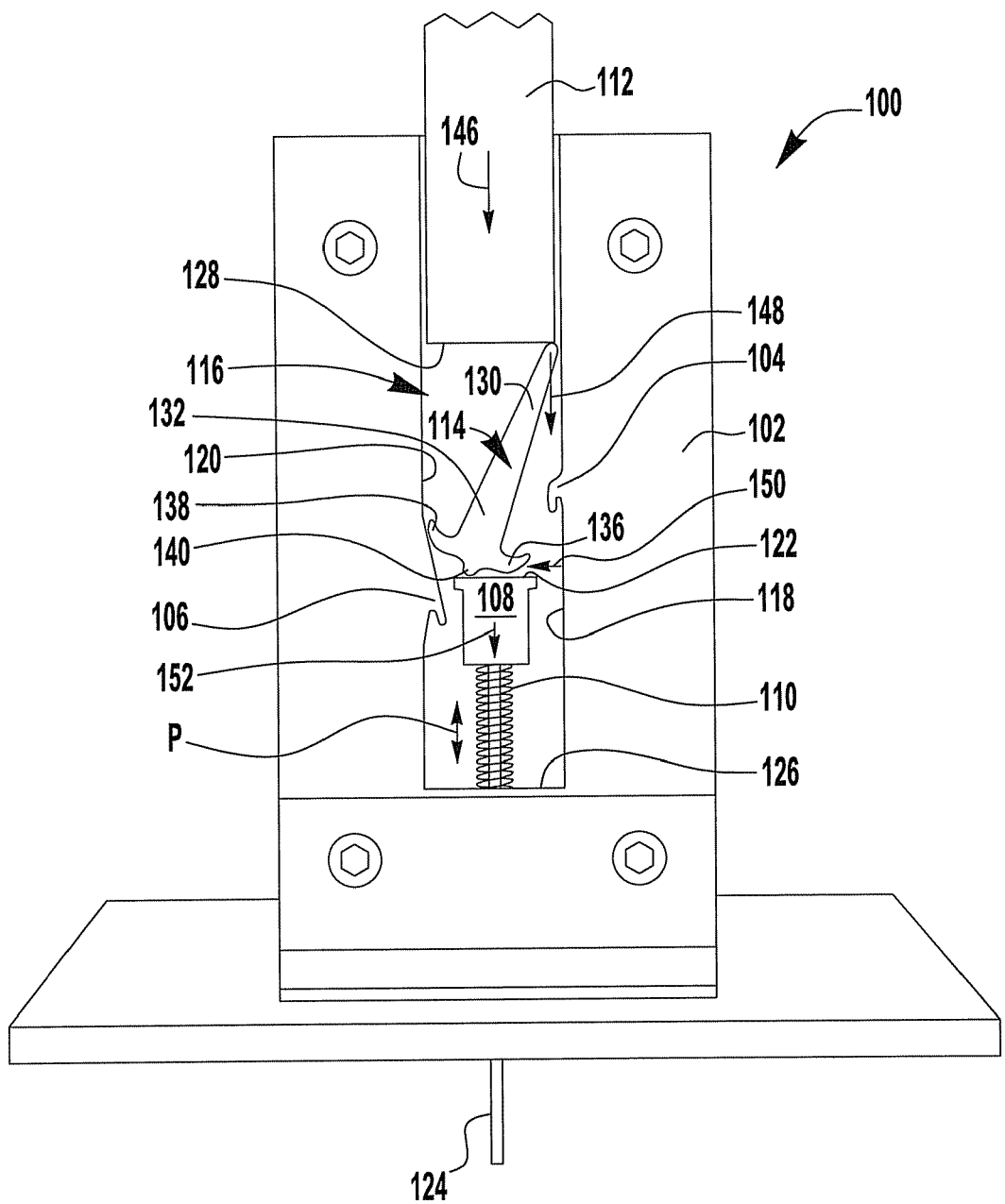
FIG. 1B illustrates the latching motion transfer mechanism where force has been applied to a drive member to move the detent member from the retracted position to an intermediate, disengaged position.

FIG. 1B illustrates how the mechanism 100 in the position shown in FIG. 1A responds when a force indicated by arrow 146 is applied to drive member 112. Initial downward movement of the drive member 112 separates the detent member 114 from the first catch 104 along the path of travel. The end of the leg portion 130 may be disposed against the first wall 118 and the drive member 112. The latch portion 132 engages the plunger 108 at a point that is laterally offset across the channel from the first wall 118 where the drive member 112 engages the leg portion 130. As a result, when force is transferred from the drive member 112 to the detent member as indicated by arrow 148, a moment is created that causes the detent latch portion 132 to slide across the channel as indicated by arrow 150. Further downward movement of the drive member 112 is transferred through the detent member 114 to the plunger to move the plunger as indicated by arrow 152.

Figure 1C:
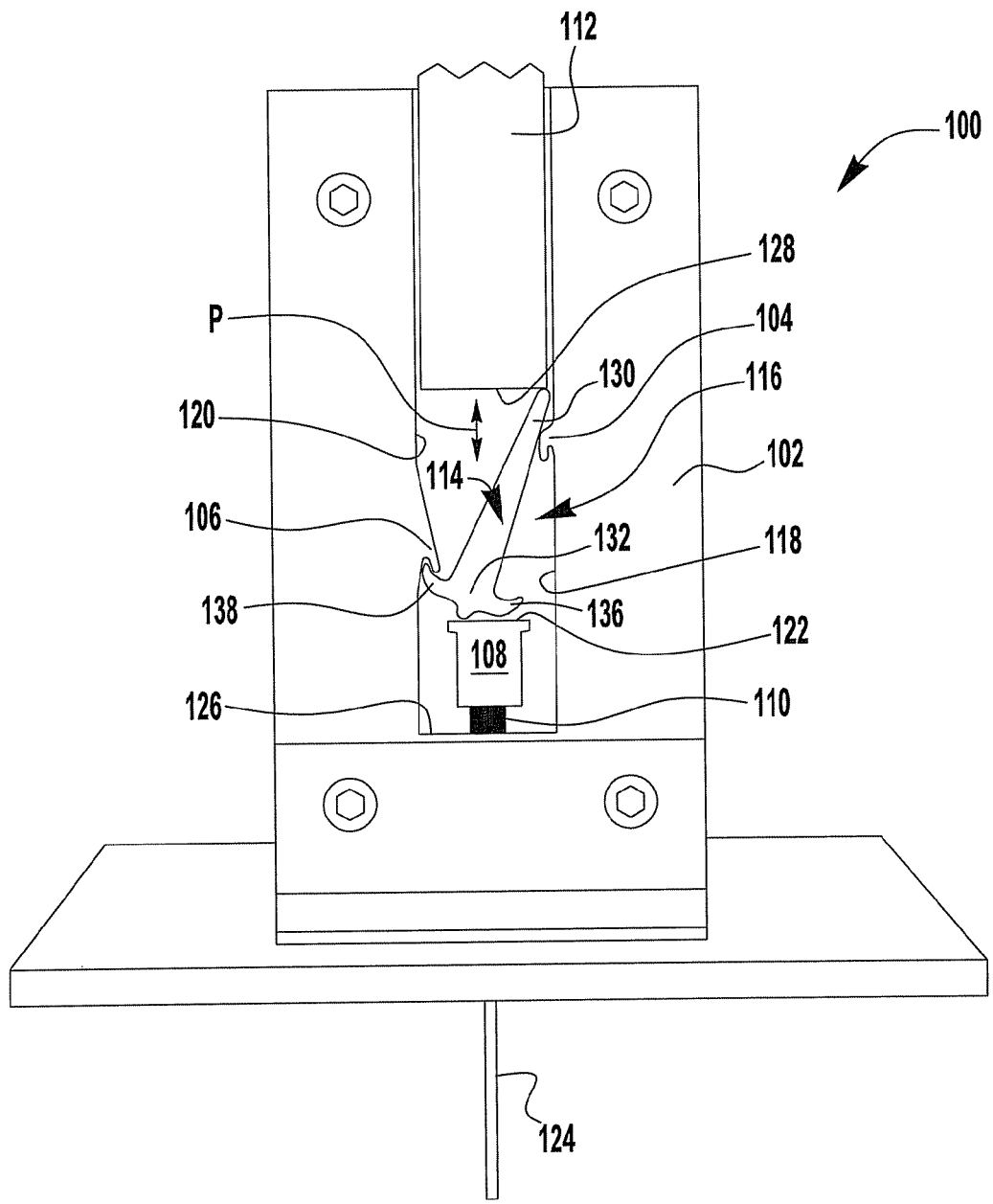
FIG. 1C illustrates the latching motion transfer mechanism with the detent member latched at an extended position, while force is maintained on the drive member.

FIG. 1C illustrates how the mechanism 100 in the position shown in FIG. 1B responds when force indicated by arrow 146 continues to be applied to the drive member 112. The force applied by the drive member 112 continues to move the detent member 114 and the plunger 108 along the path of travel P. The second latch projection 138 slides over and past the second catch 106 and into engagement with the second wall 120.

Figure 1D:
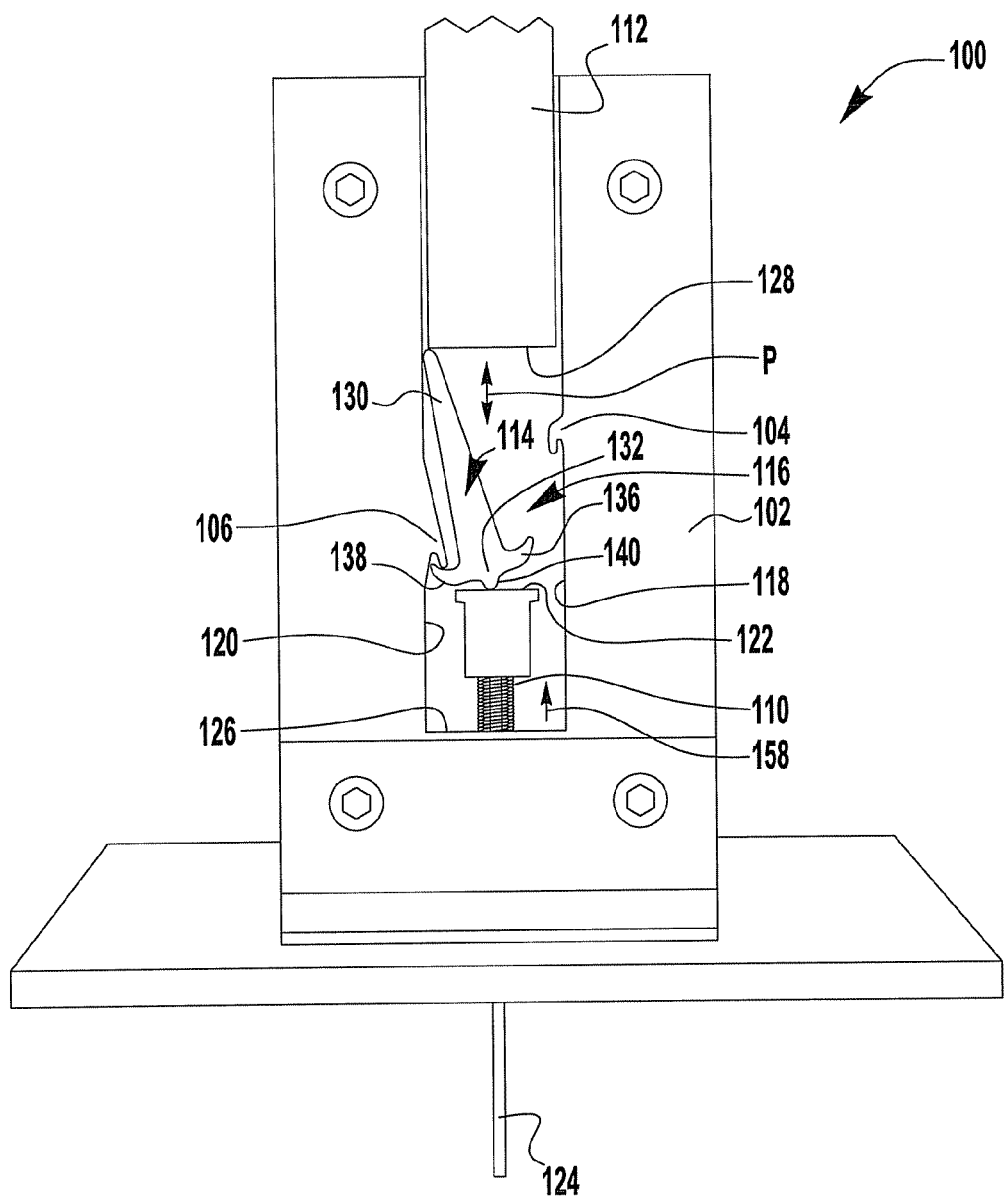
FIG. 1D illustrates the latching motion transfer mechanism with the detent member latched at an extended position, when force is removed from the drive member.

FIG. 1D illustrates how the mechanism 100 in the position shown in FIG. 1C latches in an extended position when the drive member 112 is released. When the drive member 112 is released, the biasing member 110 urges the second latch projection 138 against the second catch 106. The force applied by the biasing member 110 to the latch portion 132 causes the detent member 114 to pivot about the second catch such that the end of the leg portion 130 slides across the surface 128 of the drive member 112 and into engagement with second wall 120. The biasing member 110 urges the second latch projection 138 against the second catch 106 to inhibit the second latch projection 138 from disengaging from the second catch 106. The engagement of the second latch projection 138 with the second catch inhibits movement of the plunger 108 and the driven member 124 in the direction indicated by arrow 158.

Figure 1E:
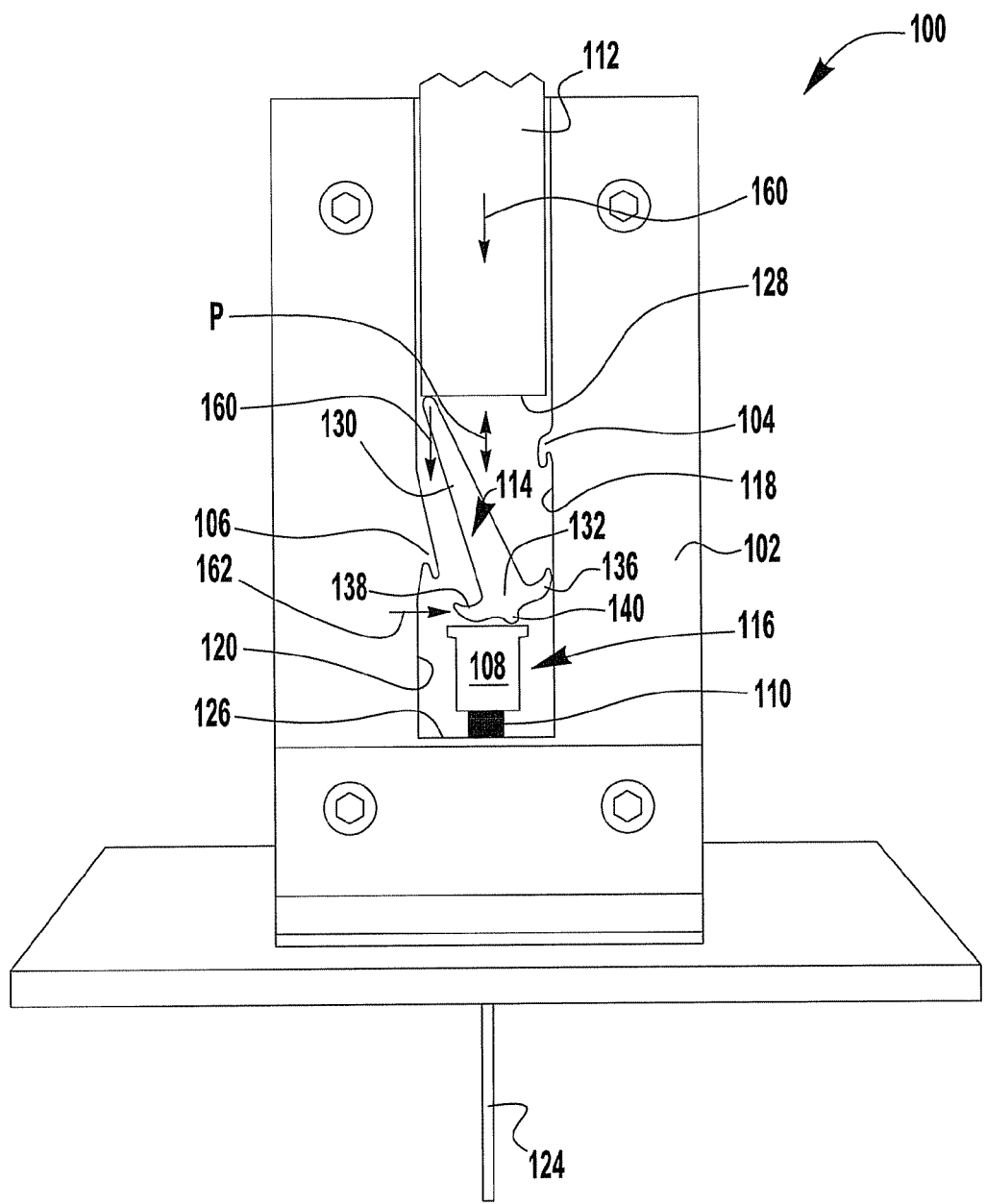
FIG. 1E illustrates the latching motion transfer mechanism where force has been applied to a drive member to move the detent member from the extended position to an extendedly disengaged position.

FIG. 1E illustrates how the mechanism 100 latched in the extended position shown in FIG. 1D disengages when a force indicated by arrow 160 is again applied to drive member 112. Initial downward movement of the drive member 112 separates the detent member 114 from the second catch along the path of travel P. The end of the leg portion 130 is disposed against the second wall 120 and the drive member 112. The latch portion 132 engages the plunger 108 at a point that is laterally offset across the channel from the second wall 120 where the drive member engages the leg portion. As a result, when force is transferred from the drive member 112 to the detent member as indicated by arrow 160, a moment is created that causes the detent latch portion 132 to slide across the channel as indicated by arrow 162.

Figure 1F:
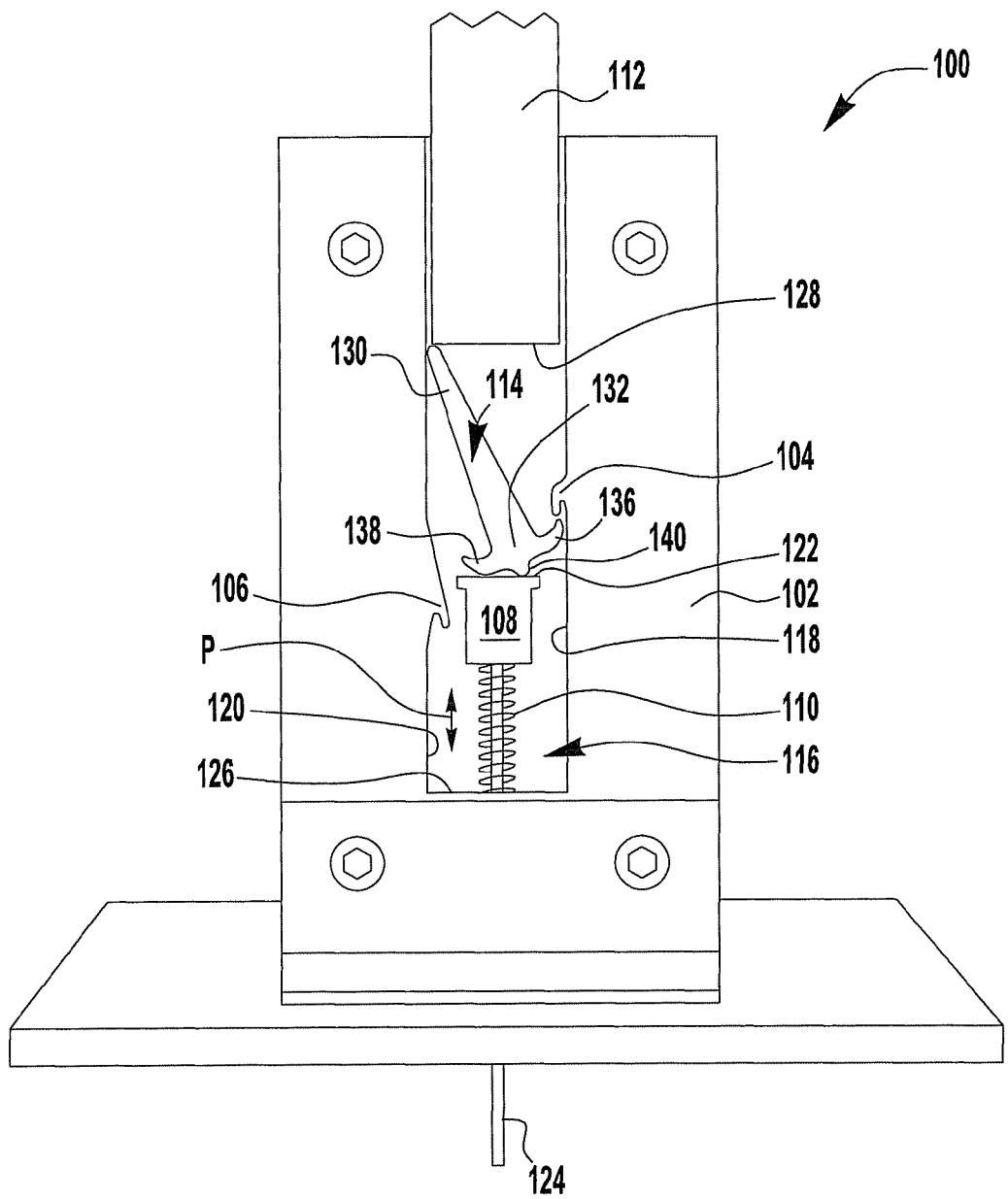
FIG. 1F illustrates the latching motion transfer mechanism with the detent member latched at the retracted position, while force is maintained on the drive member.

FIG. 1F illustrates how the mechanism 100 in the position shown in FIG. 1E responds when the force applied to the drive member 112 is gradually removed. As the force applied to the drive member 112 is reduced, biasing member 112 and the plunger 108 move upward along the path of travel until the first latch projection 136 engages the first catch 104 again.

Figure 1G:
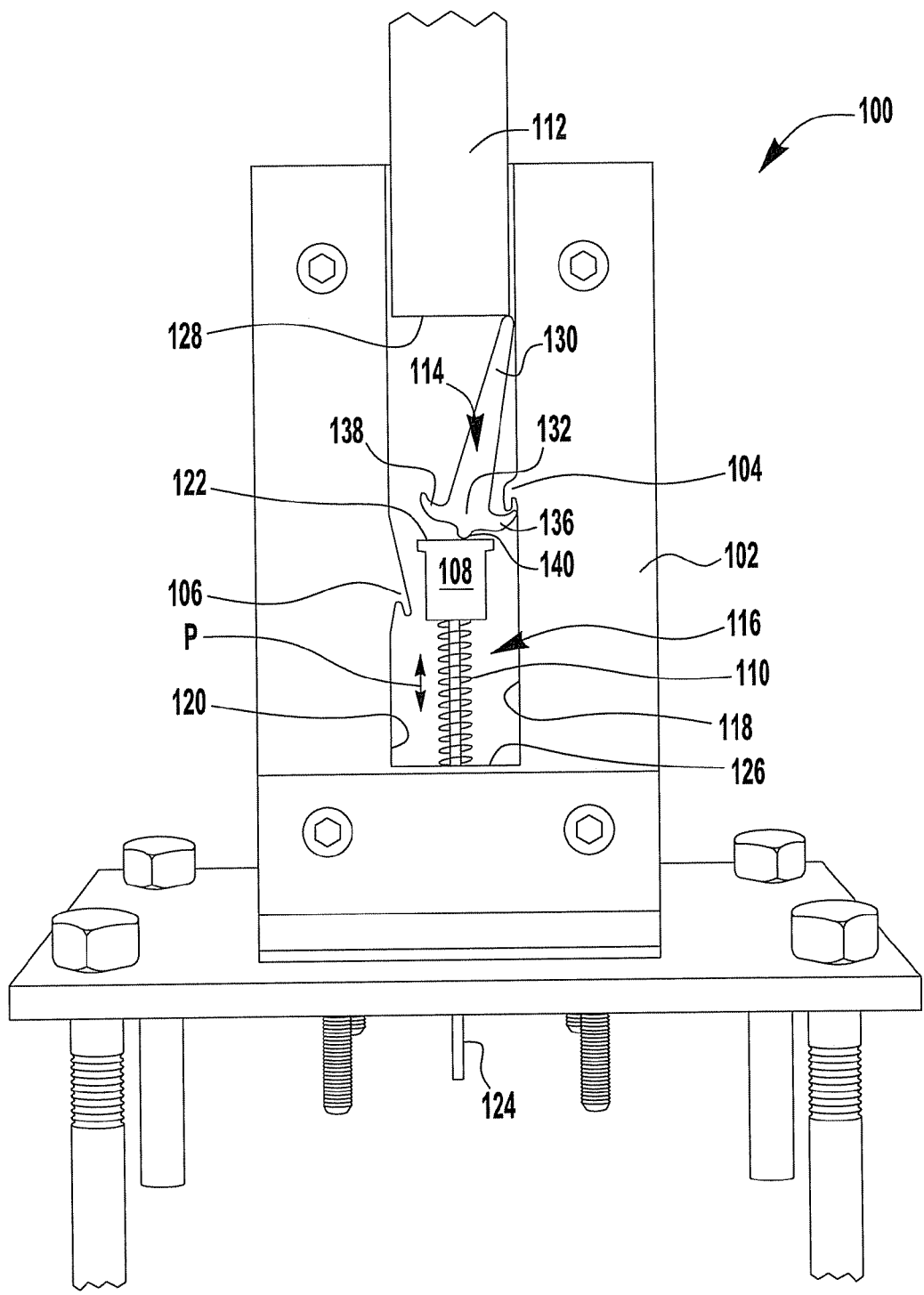
FIG. 1G illustrates the latching motion transfer mechanism with the detent member latched at the retracted position, when force is removed from the drive member to return the detent to the initial position.

FIG. 1G illustrates how the mechanism 100 in the position shown in FIG. 1F latches in the retracted position when the drive member 112 is released. When the drive member 112 is released, the biasing member 110 urges the first latch projection 136 against the first catch 104. The force applied by the biasing member 110 to the latch portion 132 causes the detent member 114 to pivot about the first catch such that the end of the leg portion 130 slides across the surface 128 of the drive member 112 and into engagement with first wall 118, to thereby return the mechanism to the position shown in FIG. 1A. The mechanism may be alternately moved between the latched extended position and the latched retracted position by repeatedly applying and releasing force to the drive member in the same direction.

Figure 2:
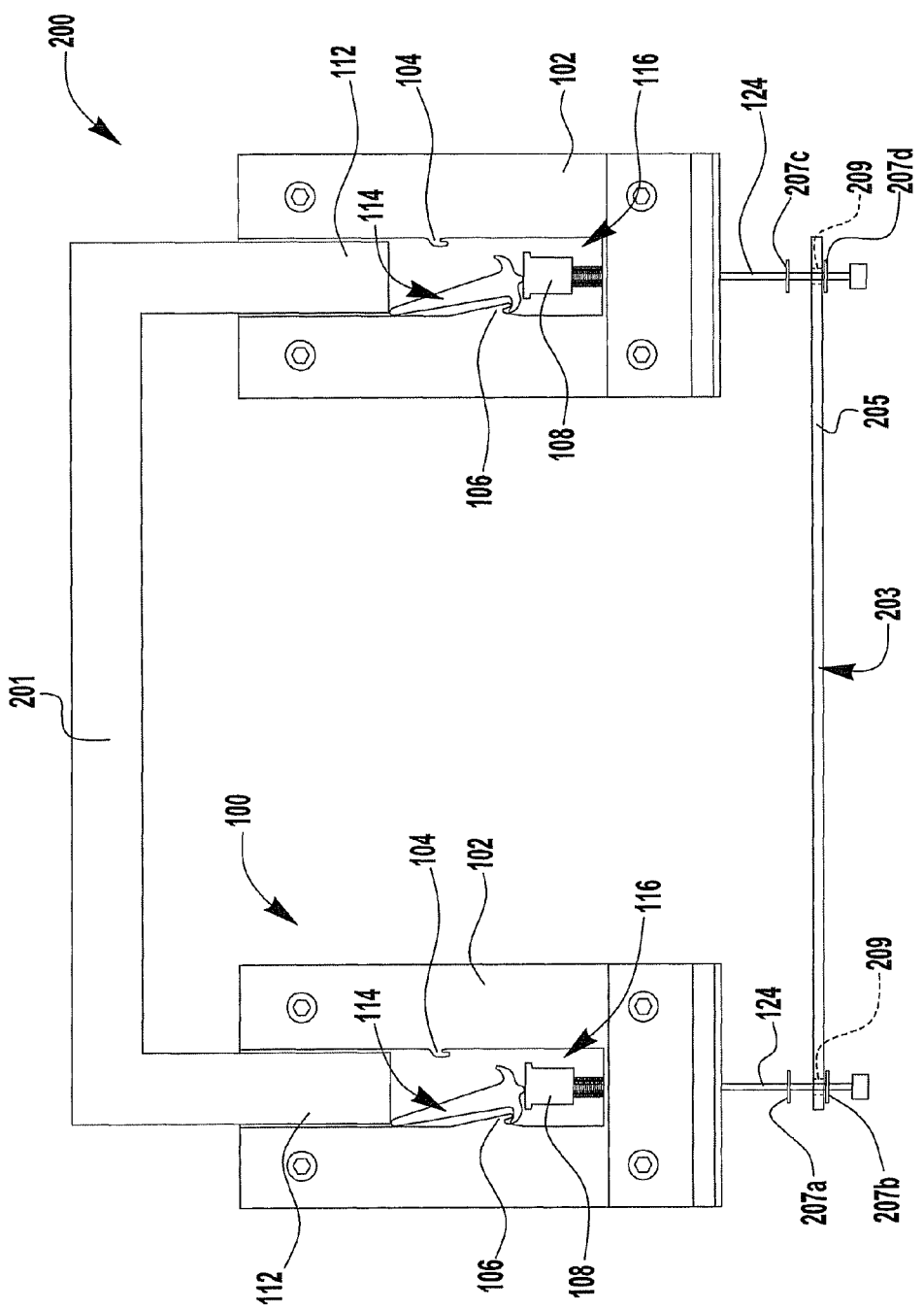
FIG. 2 illustrates an embodiment, where two latching motion transfer mechanisms are coupled together to maintain synchronization between the two latching motion transfer mechanisms.

FIG. 2 illustrates an embodiment where a latching motion transfer mechanism 100 may be operably coupled to a second motion transfer mechanism 200. The latching motion transfer mechanisms may be linked together for use in a wide variety of different applications. For example, the latching motion transfer mechanisms may be linked together to lift multiple objects at the same time. One use for latching motion transfer mechanisms that are linked together is lifting one or more pairs of caster assemblies from a support surface at the same time. In the embodiment illustrated by FIG. 2, the drive members 112 of the two mechanisms 100, 200 are driven by a commonly actuated member or assembly 201. The single member 201 allows both mechanisms to be actuated by a single movement.

Referring to FIG. 2, the latching motion transfer mechanism 100 is coupled to the second latching motion transfer mechanism 200 by a linkage 203 that maintains mechanical synchronization between the first mechanism 100 and the second mechanism 200 and resynchronizes detent members that become unsynchronized. In this application, two latching motion transfer mechanisms are mechanically synchronized if they are both in a substantially extended position or they are both in a substantially retracted position, even if one of the detent members is latched and the other detent member is disengaged. In an exemplary embodiment, the linkage causes the detent members 114 of the mechanisms 100, 200 to resynchronize upon pressing of the single member 201 as will be described in more detail below. The detent members 114 are mechanically synchronized when both detent members latch with the same catch at substantially the same time. The linkage may take a wide variety of different forms. Any linkage that keeps detent members of two latching motion transfer mechanisms mechanically synchronized and resynchronizes the detent members upon movement of the drive members 112 may be used.

In the embodiment illustrated by FIG. 2, the linkage 203 may be a member that is coupled to the driven member 124 of the latching motion transfer mechanism 100 and to a driven member 124 of the latching motion transfer member 200. The driven members 124 are coupled to the linkage 203 such that the driven members 124 can move only a small amount without engaging the linkage 203. As a result, the relative position of the plunger 108 of the first mechanism 100 with respect to a plunger 108 of the second mechanism 200 is limited to a small amount of travel, which is less than the distance between the latched position and the unlatched position. In an exemplary embodiment, the linkage 203 maintains a disengaged mechanism in the extended position whenever a coupled mechanism is latched in the extended position. That is, latching of one mechanism in the extended position holds both mechanisms in the extended position.

The linkage 203 illustrated by FIG. 2 comprises a member 205 and stops 207A, 207B, 207C, 207D. The driven members 124 extends through openings 209 in the member 205. Stops 207A, 207B, 207C, 207D are positioned on the driven member 124 to limit relative movement of the driven members 124 with respect to the member 205.

FIG. 3 illustrates a situation where both detent members 114 were initially latched and the detent member of the mechanism 100 then disengaged while the detent member of the second mechanism 200 remained latched. This situation may occur in a variety of different ways. For example, if the member 201 is bumped near the first mechanism 100, the detent member 114 of the first mechanism 100 might disengage while the detent member of the second mechanism 200 remains engaged. If this situation were to occur, the coupling 203 maintains both driven members in the extended position. When the detent member 114 of the first mechanism 100 disengages, the driven member 124 moves upward as indicated by arrow 250 until the lower stop 207 B of the mechanism 100 engages the member 205 and member 205 engages the upper stop 207 C of the second mechanism. This engagement prevents additional retraction of the driven member 124 of the mechanism 100.

Figure 4A:
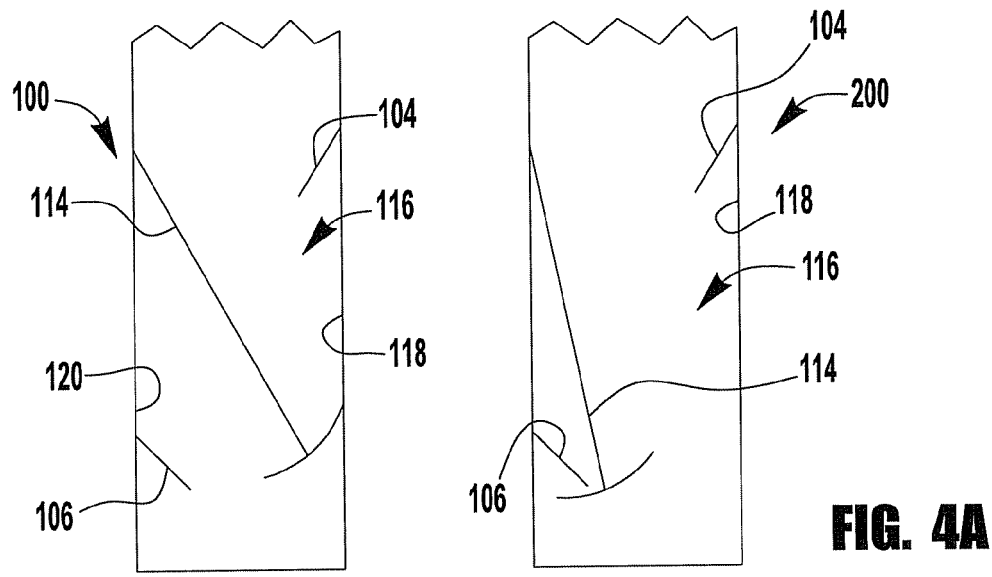
FIGS. 4A and 4B schematically illustrate how the coupling of the of the two latching motion transfer mechanisms together maintains synchronization of the detent members when the situation illustrated by FIG. 3 occurs.
Figure 4B:
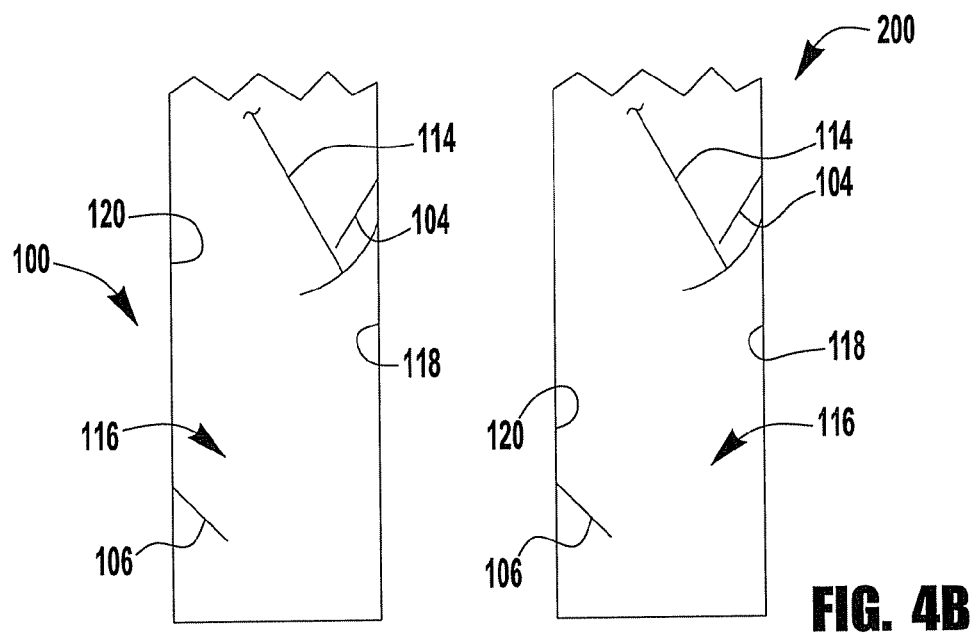

FIG. 4A schematically illustrates the situation shown in FIG. 3. FIG. 4B illustrates that when the single drive member 201 is depressed again the detent member of the second mechanism 200 disengages (the detent member of the first mechanism is already disengaged) and, both detent members 114 move to the retracted position and engage the first catches 104, 204. When the drive member 201 is pressed again, both detent members 114 will latch with the second catches 106, to latch the mechanisms 100, 200 in the extended position.

FIG. 5 illustrates a situation where the detent member 114 of the second mechanism 200 initially latched and the detent member 114 of the first mechanism 200 failed to latch. This situation may occur in a variety of different ways. For example, if the member 201 is depressed near the mechanism 200 the detent member 114 of the second mechanism 200 could latch while the detent member 114 of the first mechanism 100 remains disengaged. If this situation were to occur, the coupling 203 maintains both driven members in the extended position. When the detent member 114 of the mechanism 100 is not latched, the lower stop 207B of the mechanism 100 engages the member 205 and member 205 engages the upper stop 207C of the second mechanism. This engagement maintains the mechanism 100 in the extended position.

Figure 6A:
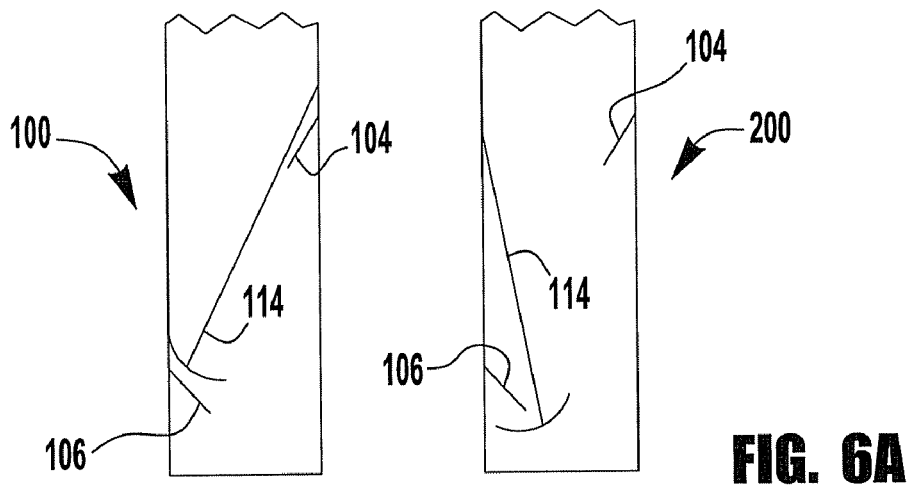
FIGS. 6A-6C schematically illustrate how the coupling of the of the two latching motion transfer mechanisms together maintains synchronization of the detent members when the situation illustrated by FIG. 5 occurs.
Figure 6B:
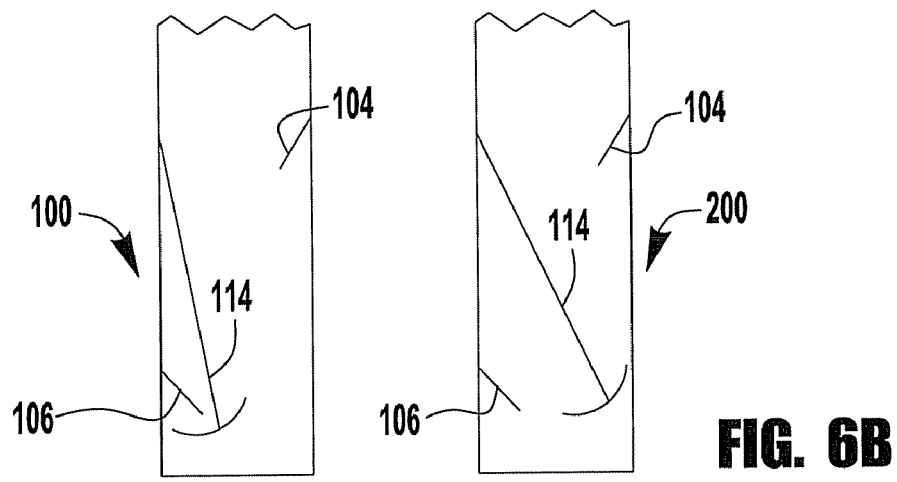
Figure 6C:
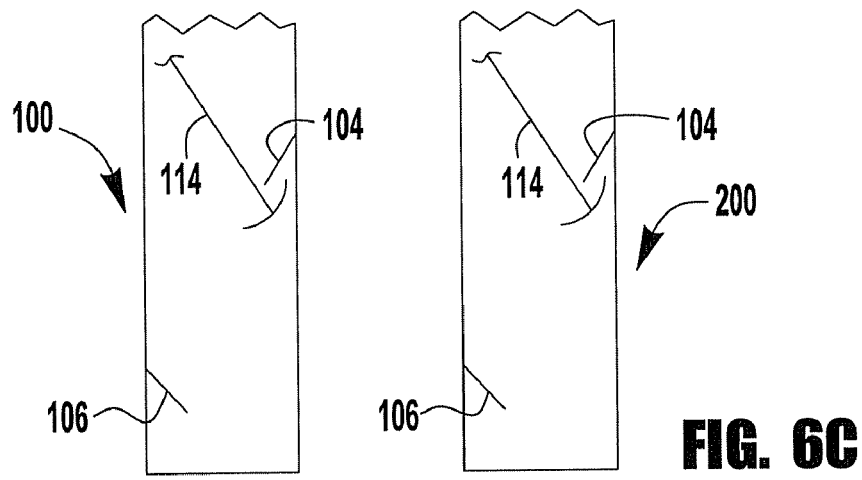

FIG. 6A schematically illustrates the situation shown in FIG. 5. FIG. 6B illustrates that when the single drive member 201 (shown in FIG. 5) is depressed again, the detent member 114 of the first mechanism 100 latches and the detent member 114 of the second mechanism 200 disengages. As a result, both mechanisms remain in the extended position. When the single drive member 201 (shown in FIG. 5) is depressed again, both detent members 114, move to the retracted position and engage the first catches 104. When the drive member 201 is pressed again, both detent members 114, will latch with the second catches 106, to latch the driven members 124, in the extended position.

Figure 7:
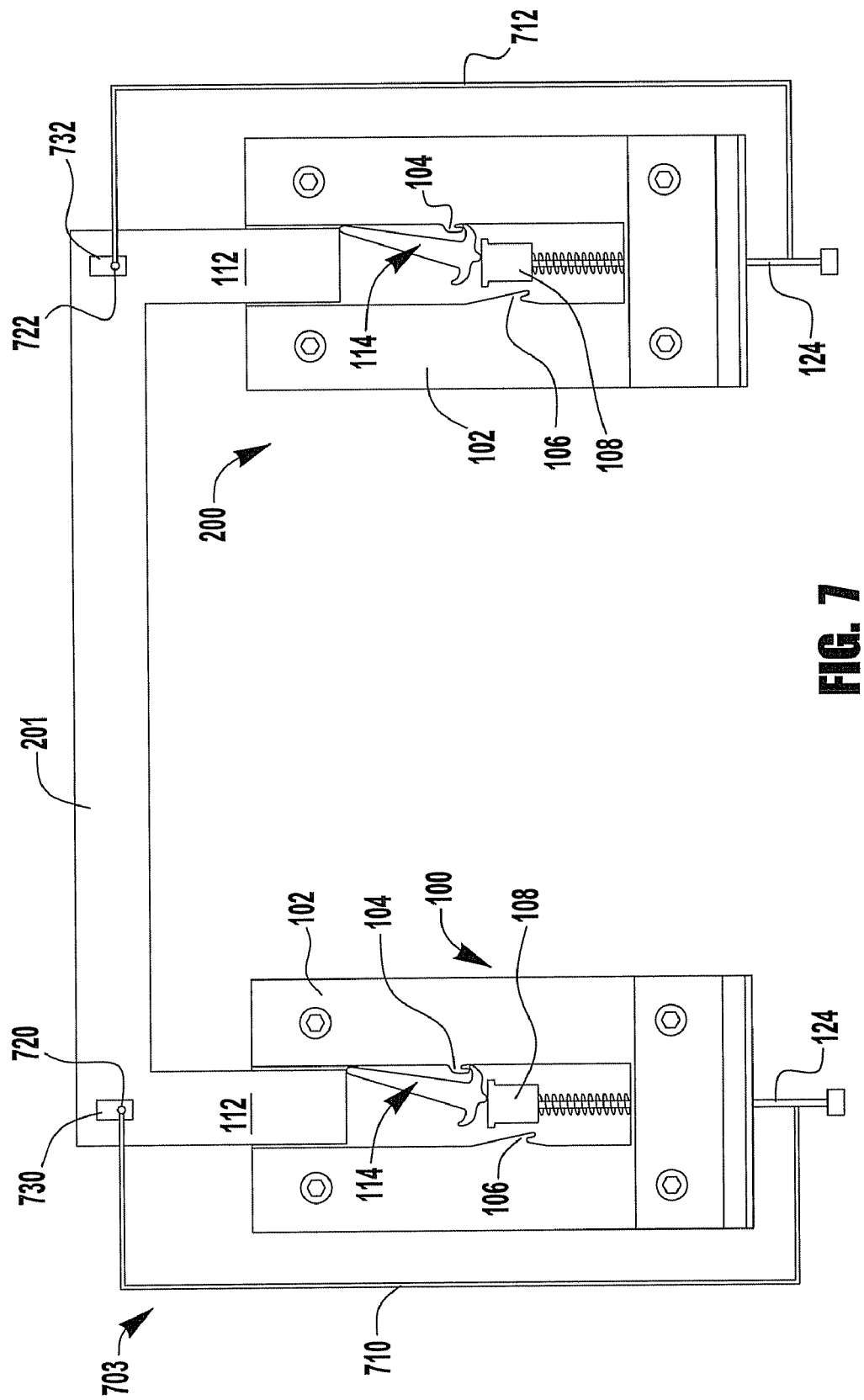
FIG. 7 illustrates another embodiment, where two latching motion transfer mechanisms are coupled together to maintain synchronization between the two latching motion transfer members.

FIG. 7 illustrates another embodiment of a latching motion transfer mechanism 100 that is coupled to a second latching motion transfer mechanism 200 by a linkage 703 that maintains synchronization between the driven members 124 of the mechanisms 100, 200 and resynchronizes the detent members of the mechanisms if one becomes disengaged while the other is latched. In the embodiment illustrated by FIG. 7, the linkage 703 comprises a member 710 that is attached to the driven member 124 of the mechanism 100 and a member 712 that is attached to the driven member 124 of the mechanism 200. The members 710, 712 are coupled to the member 201 such that each member 710, 712 may move only a small amount without engaging the member 201. As a result, the relative position of the plunger 108 of the first mechanism 100 with respect to a plunger of the mechanism 200 is maintained to within a predetermined range. In an exemplary embodiment, the linkage 201 maintains a disengaged mechanism in the extended position whenever a coupled mechanism is latched in the extended position. The coupling of the members 710, 712 to the member 201 may be achieved in a wide variety of different ways. In the example illustrated by FIG. 7, a pin 720 is attached to the member 710 that is disposed in a slot 730 of the member 201 and a pin 722 is attached to the member 712 that is disposed in a slot 732 of the member 201. Ends of the slots 730, 732 act as stops that limit movement of the members 710, 712. The embodiment linkage 703 maintains synchronization in generally the same manner as the linkage 203 and as described with respect to FIGS. 3-6.

The drive member 112 may be moved or driven in a wide variety of different ways. The drive member may be moved or driven directly, or indirectly by a powered or manual mechanism. Any mechanism may be used to move the drive member 112. FIGS. 8-11 illustrate an embodiment of a latching motion transfer mechanism 800 where the drive member 112 is moved by a pin and follower mechanism 802. The pin and follower mechanism 802 includes a pin 804 that is connected to the drive member 112 and pivot arm 806 that is pivotally connected to the frame 102 at a pivot connection 807. Referring to FIGS. 8B and 8C, the pin 804 extends through a slot 808 in the frame and a slot 810 in the pivot arm 806. The slot 808 through the frame 102 allows the pin 804 to move with the drive member along the path of travel P. Edges of the slot 810 engage the pin 804 when the pivot arm 806 is pivoted about the pivotal connection 807 to move the pin 804 and drive member 112 along the path of travel. The shape of the slot 810 in the pivot arm 806 defines the movement of the pin 804 as the pivot arm 806 is pivoted. The slot 810 may be shaped to accommodate a wide variety of different applications. The slot 810 illustrated by FIGS. 8-11 provides a variable actuation speed and force (for a constant speed/force input). The slot 810 governs the position of the follower pin 804 relative to the pivot connection, which in turn determines, at any given point, the instantaneous ratio of pivot arm 806 speed to pin 804 speed and also the amount of mechanical advantage (potential lifting force). The slot 810 shape illustrated by FIGS. 8-11 is configured to cause the pin 804 to move downward quickly at the top of the stroke (FIG. 8) of the pivot arm 806 with lower potential lifting force and then the speed of the pin decreases near the bottom of the stroke (FIGS. 9 and 10) of the with higher potential lifting force. For example, the potential lifting force increases as the driven member 124 engages the floor or support surface. The shape of the slot 810 may be optimized to reduce the amount of travel of the pivot arm 806. The travel of the pivot arm may be configured to accommodate a wide variety of different applications. The pivot arm 806 may initially be positioned at a horizontal position at the top of the stroke and then rotate downward. The pivot arm could also be initially positioned above horizontal at the top of the stroke and then pivot downward.

Figure 8A:
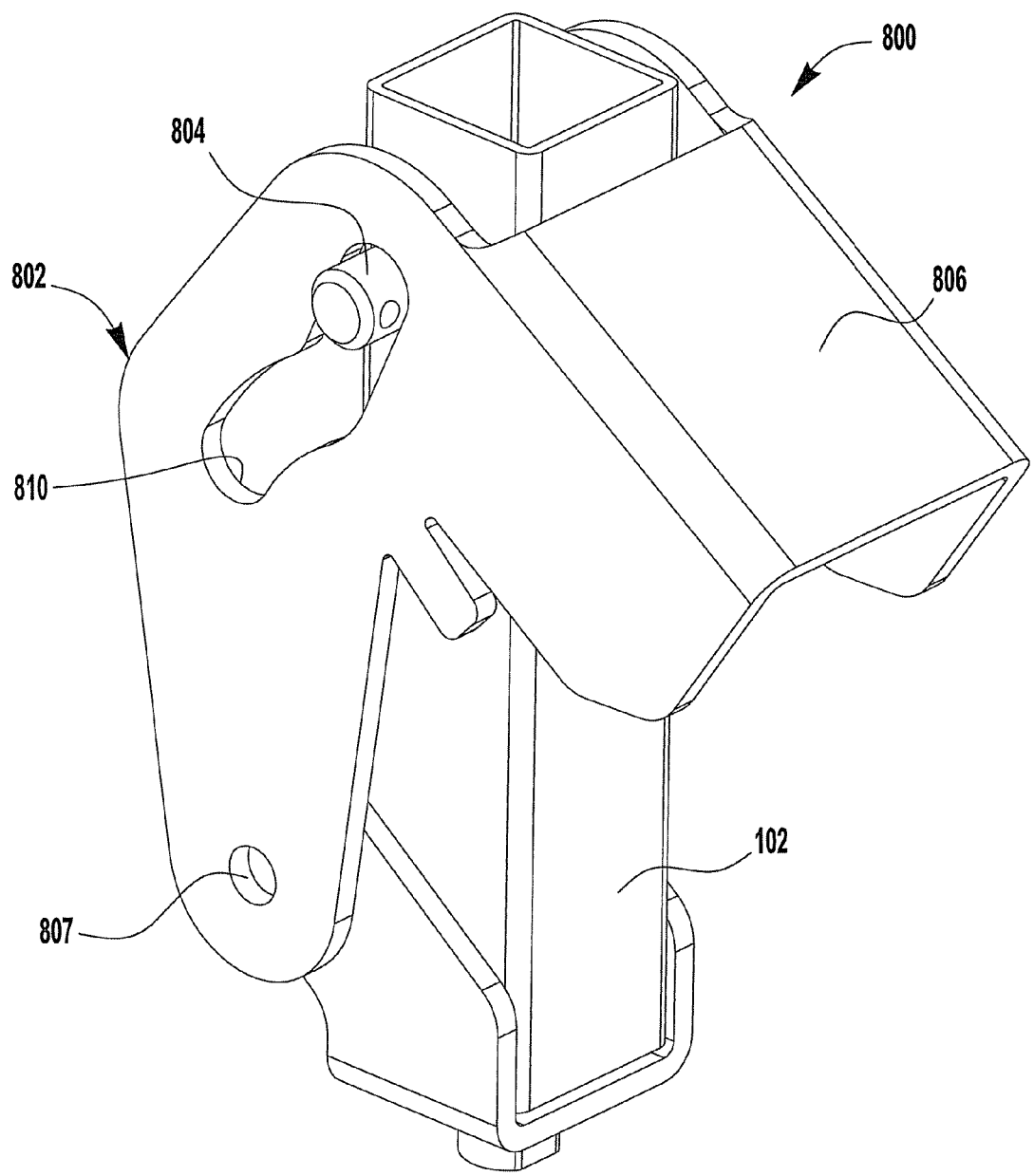
FIG. 8A is a perspective view of another embodiment of a latching motion transfer mechanism that includes a pin and follower arrangement that moves the drive member in a retracted position.

FIGS. 8A-C illustrate the mechanism 800 latched at a retracted position where the pivot arm 806 is at the top of the stroke. Referring to FIG. 8C, at this position the first latch projection 136 is in latched with the first catch 104.

Figure 9A:
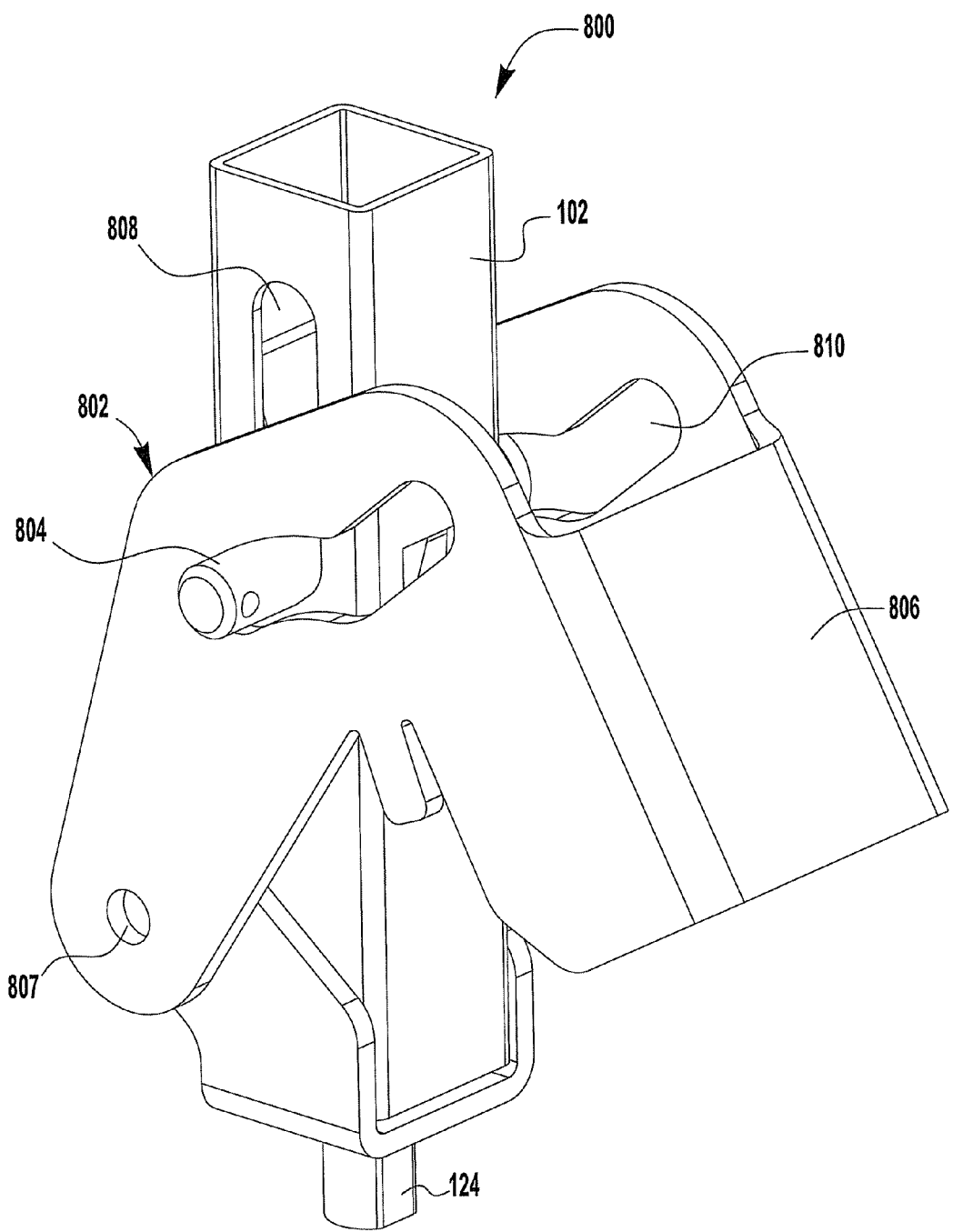
FIG. 9A is a perspective view of the latching motion transfer mechanism of FIG. 8A with the detent member moved beyond a second catch to allow the detent member to latch at the extended position.

Referring to FIGS. 9A-9C illustrate the mechanism where the pivot arm 806 has been rotated to the bottom of the stroke of the pivot arm. Referring to FIG. 9C, at the bottom of the pivot arm stroke, the latch portion 132 of the detent member 114 is moved over and past the second catch 106.

Figure 10A:
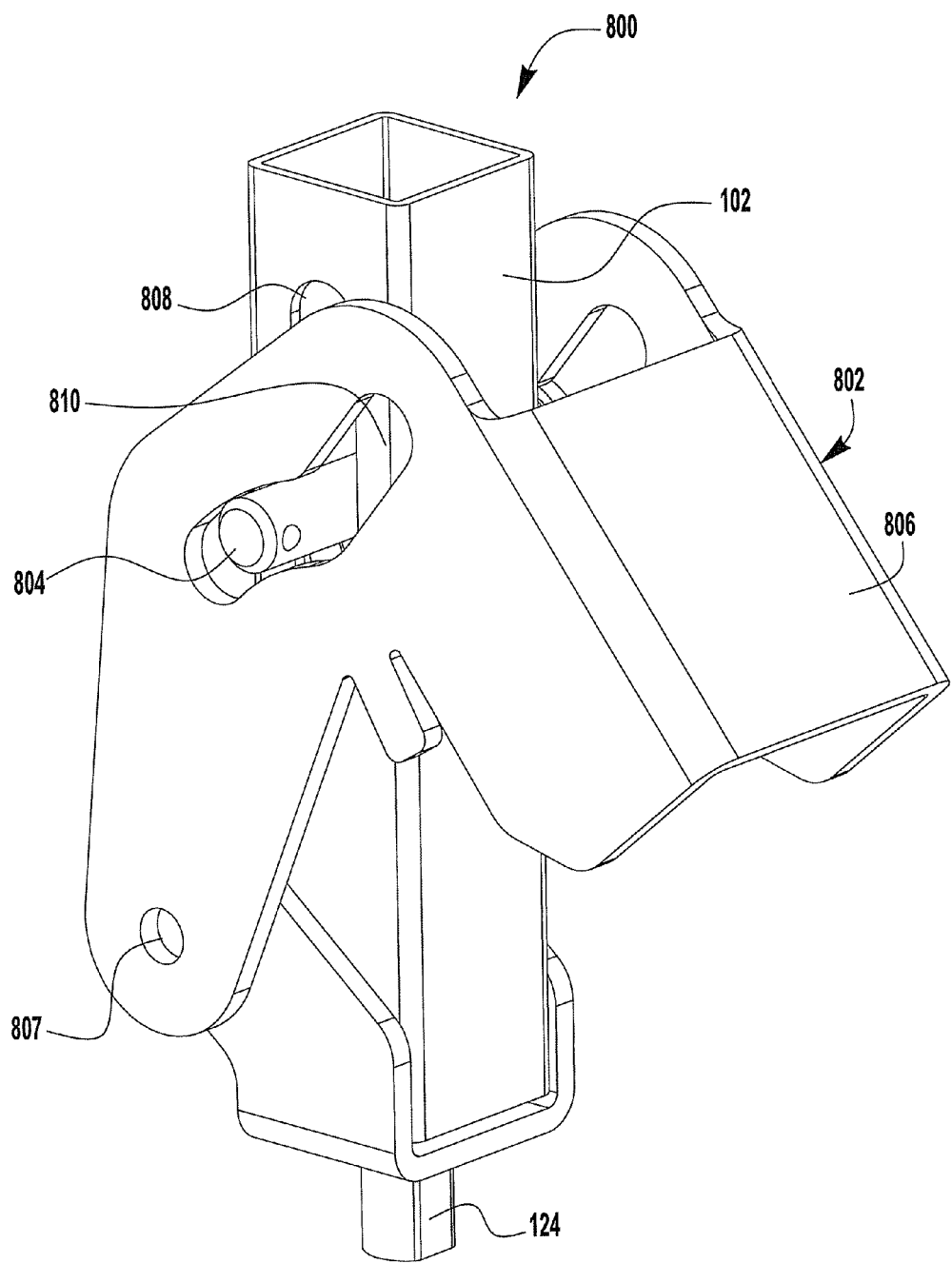
FIG. 10A is a perspective view of the latching motion transfer mechanism of FIG. 8A with the detent member latched at the extended position.
Figures 10B, 10C:
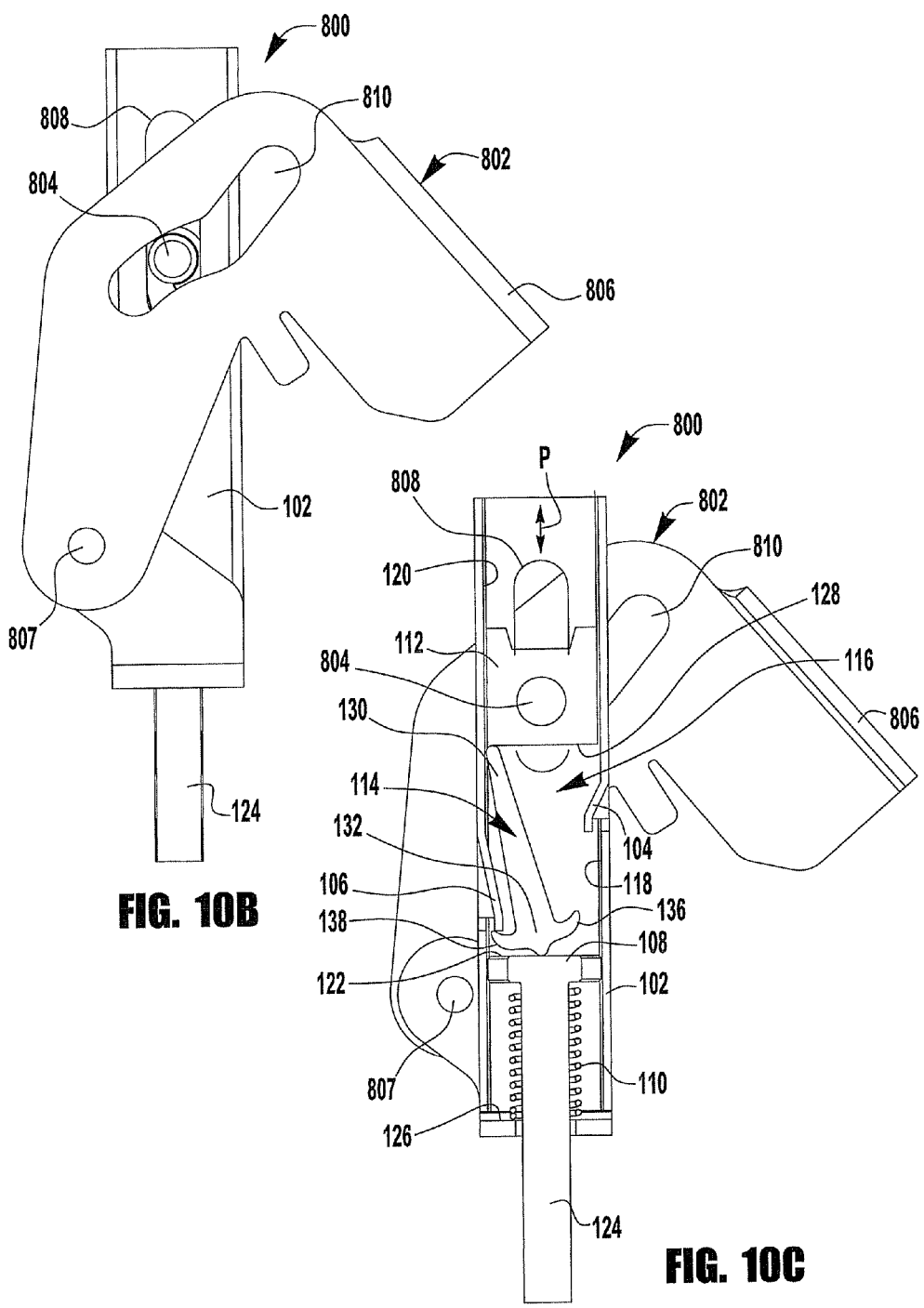
FIG. 10B is a side view of the latching motion transfer mechanism of FIG. 10A.
FIG. 10C is a sectional view of the latching motion transfer mechanism of FIG. 10A.

FIGS. 10A-10C illustrate the mechanism 800 when the pivot arm 806 is released after being moved to the bottom of the stroke to latch the mechanism in the extended position. Referring to FIG. 10C, when the pivot arm 806 is released, the second latch projection 138 latches with the second catch 106.

Figure 11A:
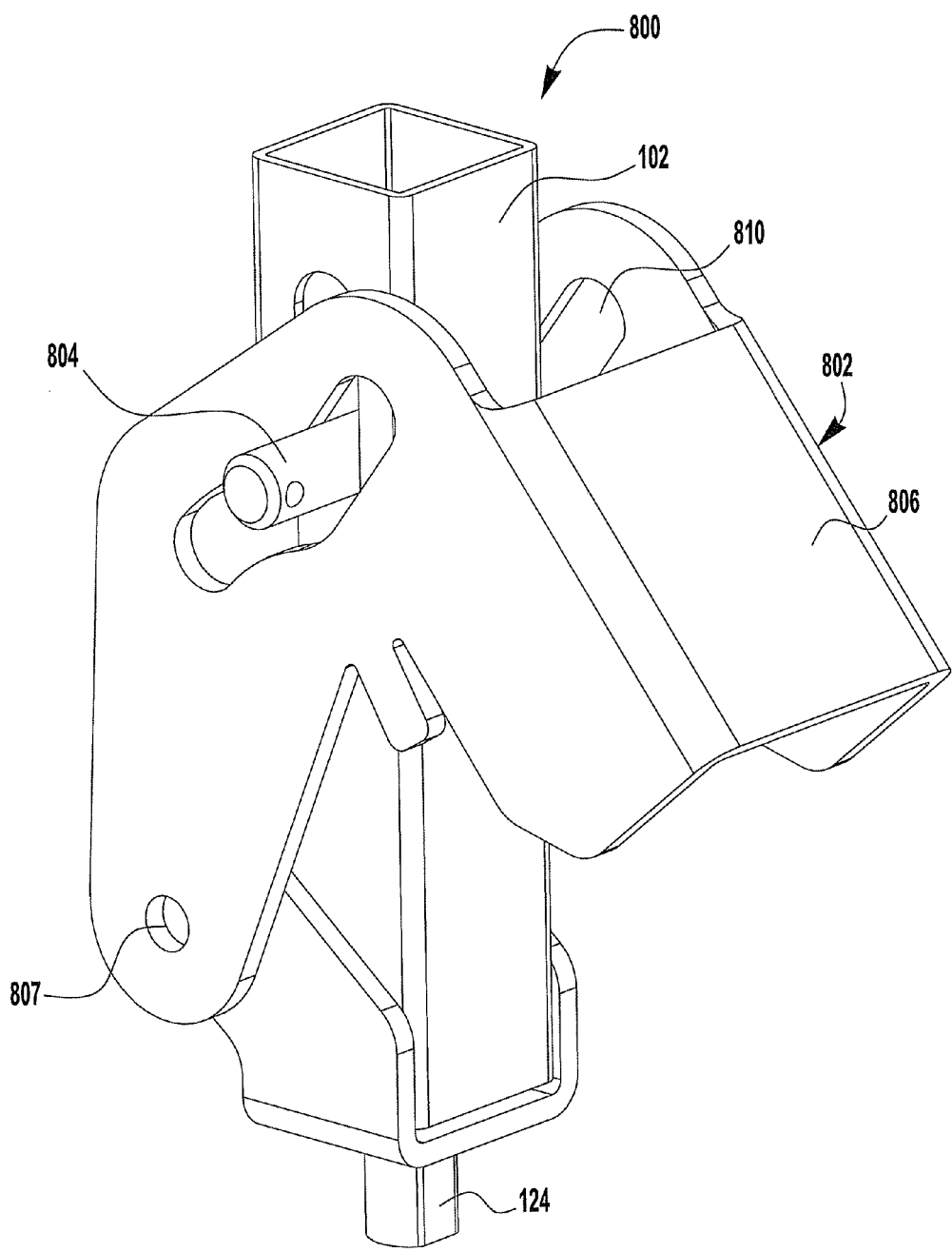
FIG. 11A is a perspective view of the latching motion transfer mechanism of FIG. 8A with the detent member disengaged from the second catch.
Figure 11B:
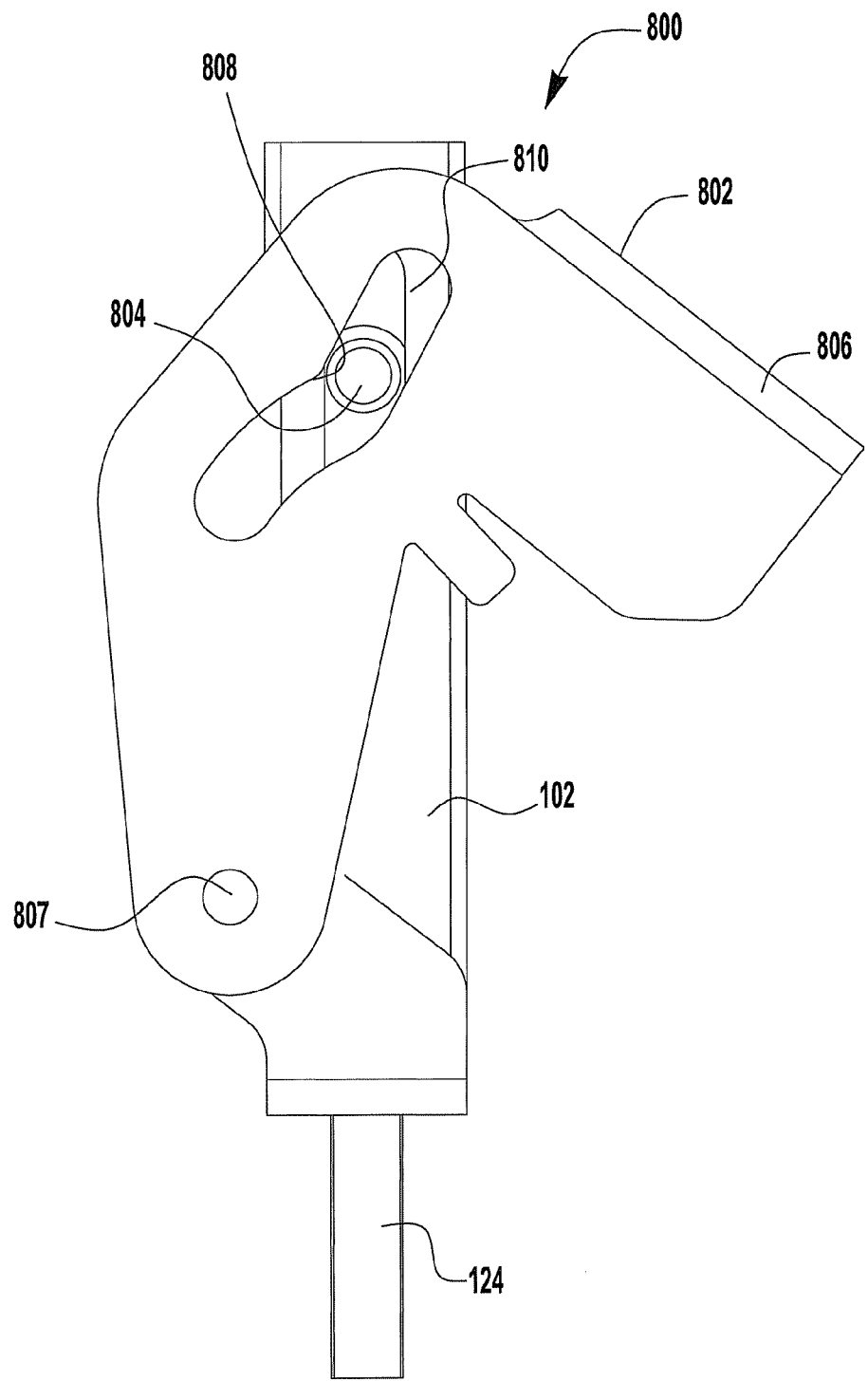
FIG. 11B is a side view of the latching motion transfer mechanism of FIG. 11A.
Figure 11C:
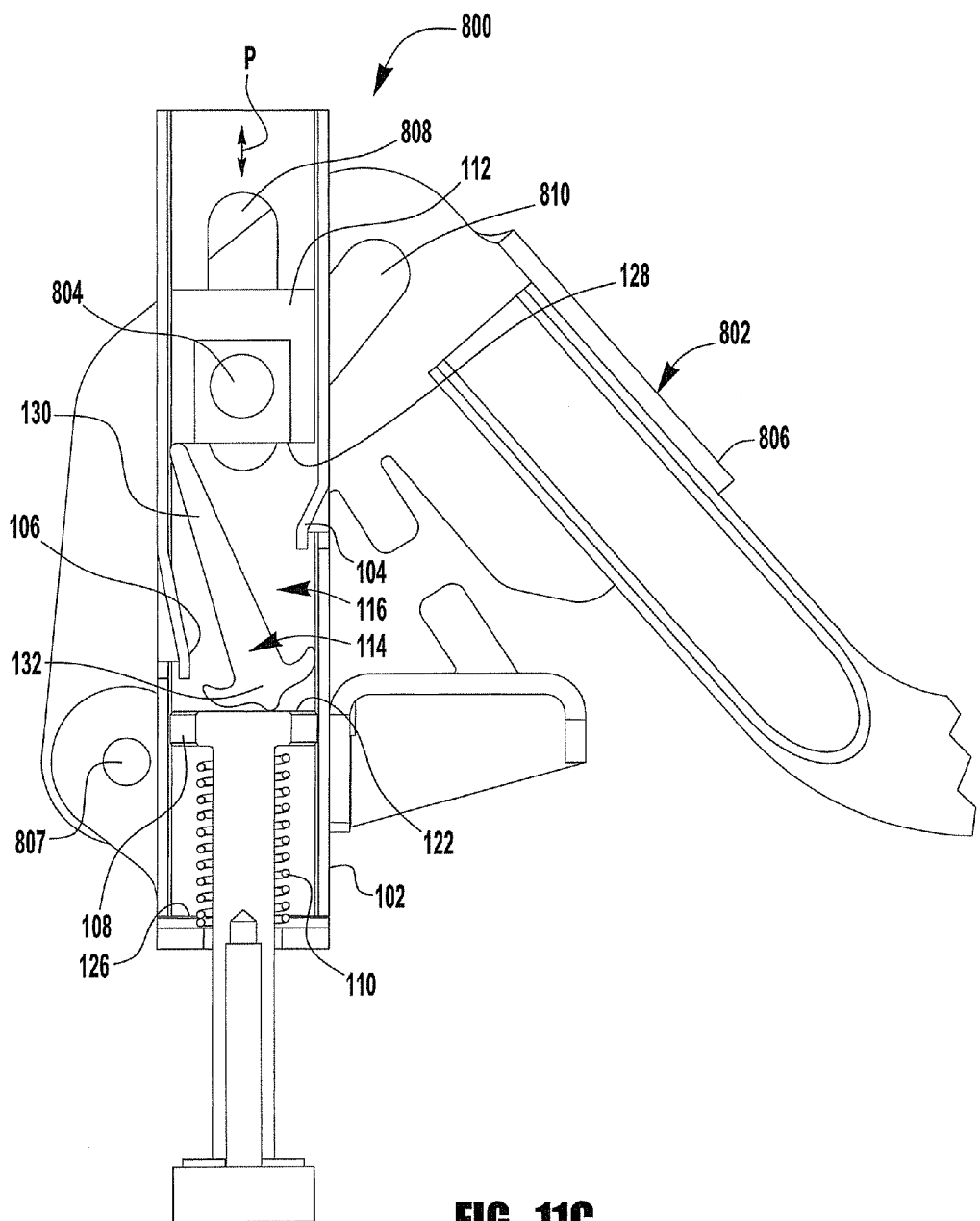
FIG. 11C is a sectional view of the latching motion transfer mechanism of FIG. 11A.

FIGS. 11A-11C illustrate the mechanism 800 when the pivot arm 806 is moved to the bottom of the stroke again and then gradually released. Referring to FIG. 11C, the second latch projection 138 disengages from the second catch 106 and moves toward the retracted position. When the pivot arm is moved to the initial position at the top of the stroke and released, the mechanism returns to the condition illustrated by FIGS. 8A-8C and is ready to operate again.

FIG. 12 illustrates an example of a single member 1200 that may be used to operate two latching motion transfer mechanisms 800 (See FIG. 8). The member 1200 may be configured to accommodate a wide variety of different applications. In one embodiment, the member 1200 is configured to be engaged by an operators foot. For example, the member may be configured to be moved by an operator stepping on the member to cause two mechanisms to lift two caster assemblies off of a support surface. In the example illustrated by FIG. 12, the member 1200 is an elongated bar that is attached to two pivot arms 806 a pin and follower mechanism to drive two mechanisms at the same time (such as the pivot arms of mechanism 800 described above). Referring to FIGS. 12 and 13, by connecting the member 1200 to two pivot arms 806 of two mechanisms 800, the movement of the pins 806 and the drive members 112 are substantially coupled together. In an exemplary the follower pins 804 are disposed at substantially the same position along their respective path of travel and the member 1200 maintains the pins in substantial alignment.

Figure 13A:
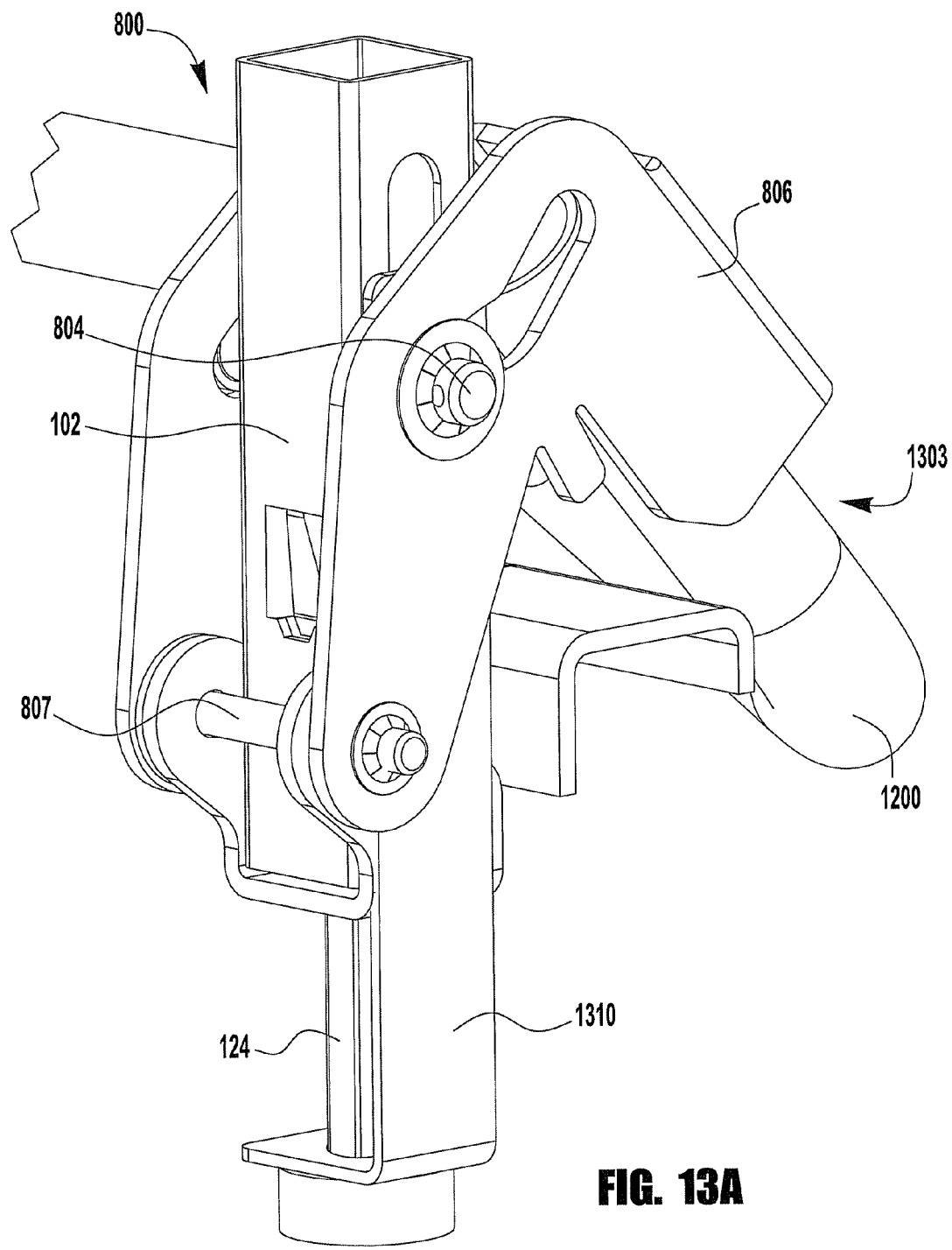
FIG. 13A is a perspective view of an embodiment of a latching motion transfer mechanism that includes a synchronization arrangement.
Figure 13B:
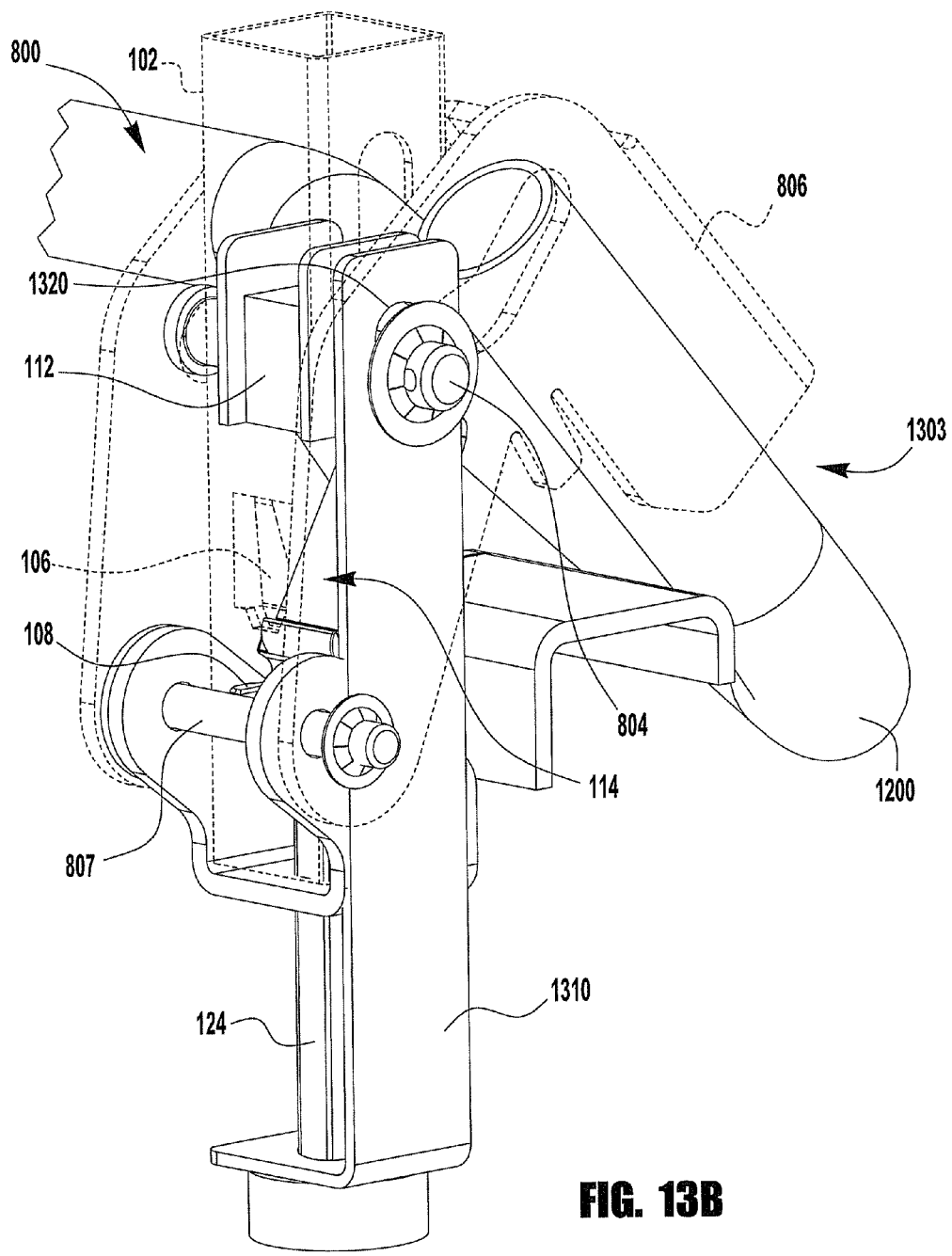
FIG. 13B is a view similar to the view of FIG. 13A where components of the latching motion transfer mechanism are transparent to illustrate internal components.

FIGS. 13A-13F illustrate another embodiment of a linkage 1303 with synchronization members 1310 that maintains synchronization between of two latching motion transfer mechanisms 800 and that resynchronizes detent members that become unsynchronized. The linkage 1303 operates to have substantially the same effect as the linkage 203 illustrated by FIG. 2 and the linkage 703 illustrated by FIG. 7. The linkage 1303 comprises synchronization members 1310 connected to the driven member 124 and coupled to the pin 804 of two latching motion transfer mechanisms 800. In FIGS. 13A and 13B, only one of the latching motion transfer mechanisms 800 with a synchronization member 1310 is shown connected to one end of the member 1200 illustrated by FIG. 12. Another substantially identical or mirror image mechanism 800 with a substantially identical or mirror image synchronization member 1310 is connected to the other end of the member 1200 and is not shown. Referring to FIG. 13B, the synchronization member 1310 is coupled to the pin 804. Since the pins 804 are coupled together by the pivot arms 806 and the member 1200, the coupling of the both driven members 124 to both pins 804 prevents one driven member from moving substantially with respect to the other driven member. The synchronization member 1310 may be coupled to the pin in a wide variety of different ways. In the example illustrated by FIG. 13B, the synchronization member 1310 includes a slot 1320 (FIG. 13B) that the pin 804 is disposed in. The synchronization member is coupled to the member 1200 through the pin such that the member 1310 may move only a small amount without engaging the pin 1310. As a result, the relative position of the plungers 108 of the two latching motion transfer arrangements are maintained to within a predetermined range. The synchronization members 1310 maintain a disengaged mechanism in the extended position whenever a coupled mechanism is latched in the extended position. Ends of the slot 1320 act as stops that limit movement of the members 1310 with respect to the pin. The embodiment of the linkage 1303 maintains synchronization in generally the same manner as the linkage 203 and 703 and as described with respect to FIGS. 3-6.

Figure 13C:
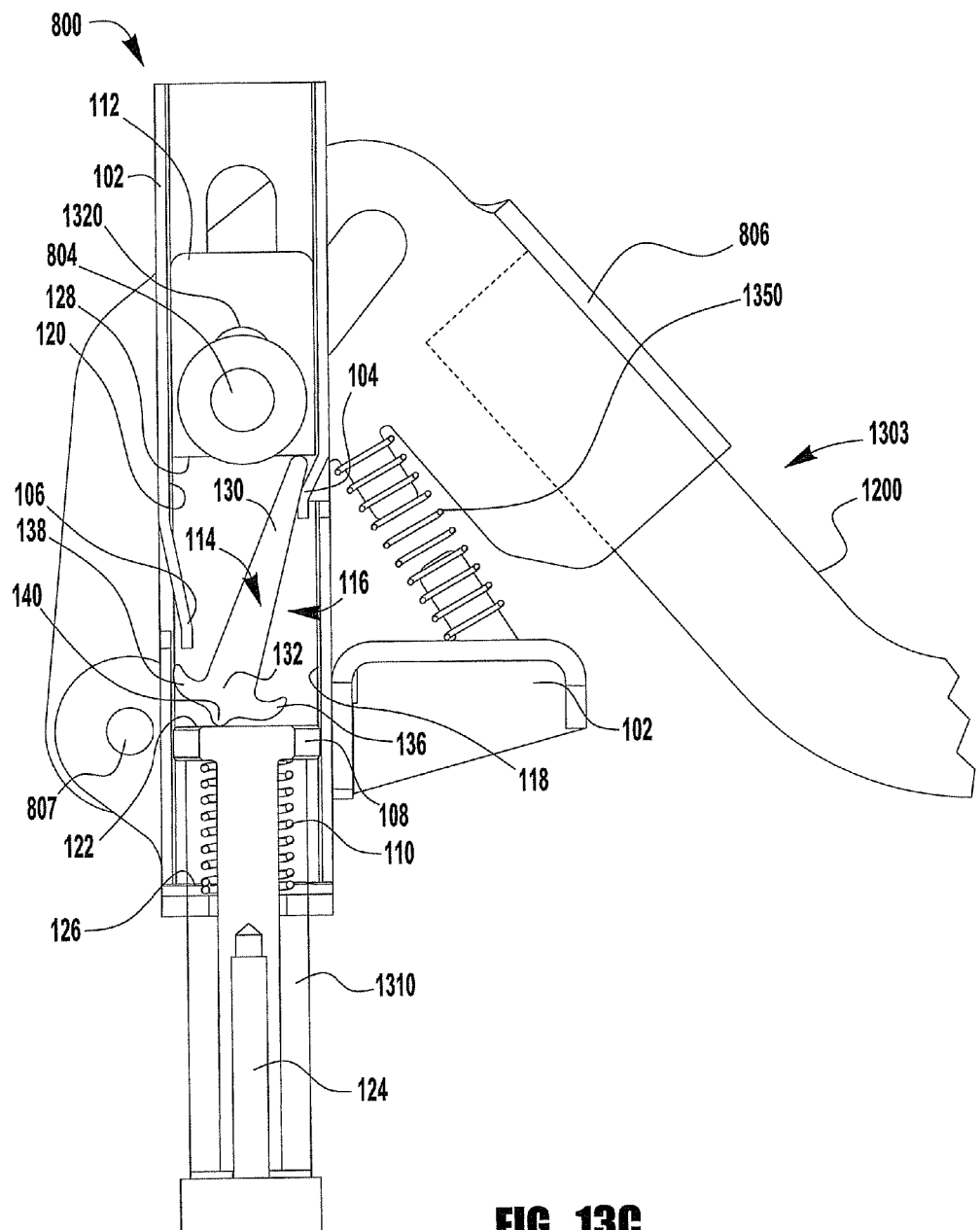
FIG. 13C is a sectional view of the latching motion transfer mechanism of FIG. 13A.
Figure 13D:
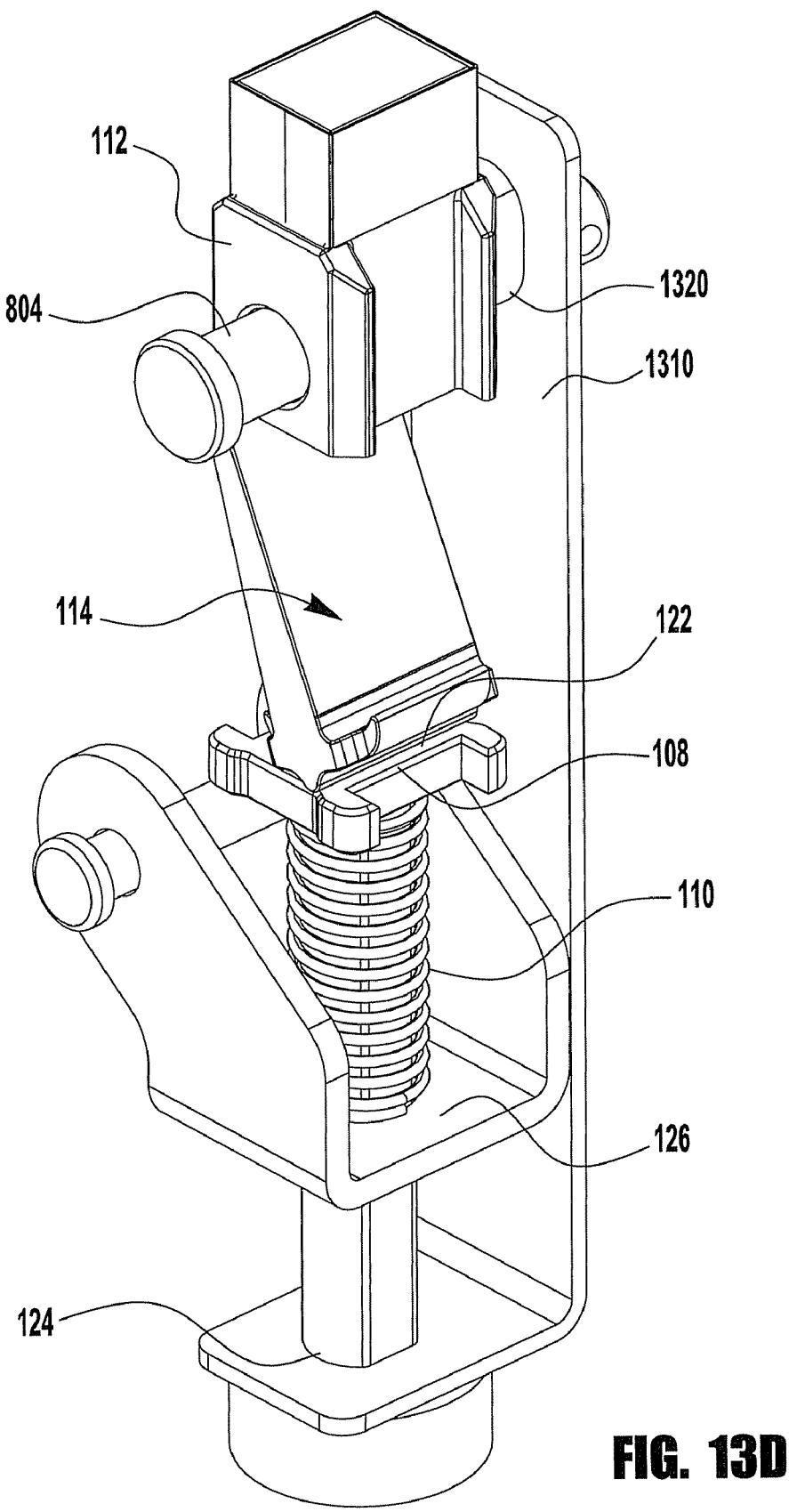
FIG. 13D is a perspective view of the latching motion transfer mechanism of FIG. 13A with components removed to more clearly illustrate the synchronization arrangement.

Referring to FIG. 13C, in an exemplary embodiment an optional second biasing member 1350 is positioned to act between the frame 102 and the lever 806 of the mechanism 800. The second biasing member 1350 assists the lever 806 in returning to the initial position at the top of its stroke (i.e. the position shown in FIG. 8A). The biasing member 1350 may take a wide variety of different forms and may be positioned in any manner that urges the pivot arm toward the top of the stroke of the pivot arm.

The latching motion transfer mechanisms disclosed herein may be implemented in a wide variety of different applications. FIGS. 14-16 illustrates one of the wide variety of applications the motion transfer mechanisms may be used in. FIG. 14 illustrates a bed 1400, which may be an articulating bed. The bed 1400 is supported by caster assemblies 1402 that allow the articulating bed to be rolled over a support surface 1404. The latching motion transfer mechanisms 100, 800 may be connected one or more of the casters or to the bed 1400 near one or more of the caster assemblies 1402 for selectively lifting the one or more caster assemblies from the support surface 1404 to stabilize the bed 1400 at a stationary position. When the bed is to be moved or otherwise supported by the casters, the latching motion transfer mechanisms are returned to the retracted position to return the caster assemblies to engagement with the support surface 1404. Pairs of the latching motion transfer mechanisms may be coupled together, or all four latching motion transfer mechanisms may be coupled together and be actuated simultaneously. In another embodiment, each latching motion transfer mechanism is actuated individually.

Figure 18:
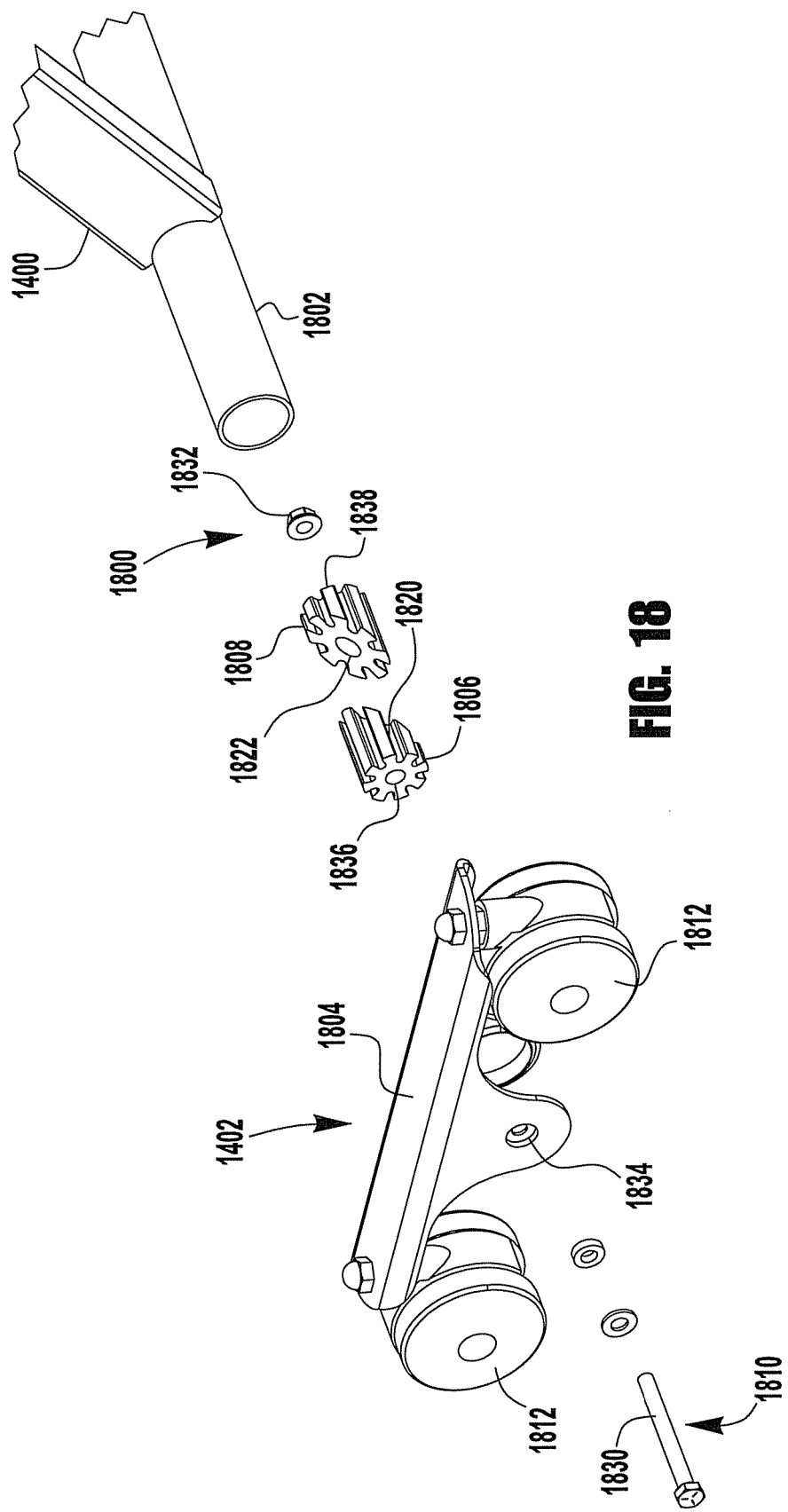
FIG. 18 is an exploded perspective that illustrates an embodiment of a caster assembly mounting arrangement.

The caster assemblies 1402 may be coupled to the bed 1400 in a wide variety of different ways. Any coupling arrangement may be used that moveably or fixedly attaches a caster assembly to the bed. FIGS. 18 and 19 illustrate one exemplary embodiment of a caster coupling arrangement 1800. The caster coupling arrangement 1800 is used with a bed 1400 that includes a tubular frame element 1802. The caster coupling arrangement 1800 includes a caster bracket 1804, a first wedge member 1806, a second wedge member 1808, and a clamping arrangement 1810. One or more casters 1812 are rotatably mounted to the caster bracket 1804. The first wedge member 1806 may take a wide variety of different forms. In the example illustrated by FIG. 18, the first wedge member 1806 is generally cylindrical with an inclined end surface 1820. The second wedge member 1808 may take a wide variety of different forms. In the illustrated example, the second wedge member 1808 is generally cylindrical with an inclined end surface 1822. The clamping arrangement 1810 may take a wide variety of different forms. Any arrangement that forces the first and second wedge members 1806, 1810 together may be used. In the illustrated embodiment, the clamping arrangement 1810 comprises a bolt 1830 and a nut 1832. The bolt 1830 extends through a hole 1834 in the caster bracket 1804, a hole 1836 through the first wedge member 1806, and a hole 1838 through the second wedge member 1808. Referring to FIG. 19, the nut 1832 is threaded onto the bolt. The first and second wedge members 1806, 1808 are slid into the tubular frame element 1802. Once the first and second wedge members 1806, 1808 are in the tubular frame element 1802, the bolt an nut are tightened to pull the inclined surfaces of the wedge members 1806, 1808 against one another. When the wedge members 1806, 1808 are pulled against one another, the inclined surfaces force the wedge members outward into engagement with the tubular frame element 1802 to secure the caster to the tubular frame element.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

The invention claimed is:

1. A latching motion transfer mechanism comprising:
   a frame that comprises an elongated channel with first and second side walls;
   a first catch along the first side wall that extends into the channel at a first position along a length of the channel;
   a second catch along the second side wall that extends into the channel at a second position along the length of the channel;
   a plunger disposed in the channel;
   a biasing member coupled to the plunger such that the plunger is urged toward the first catch by the biasing member;
   a drive member disposed at least partially in the channel;
   a detent member disposed in the channel including a leg in contact with the drive member and a latch portion in contact with the plunger having first and second latch projections extending from opposite sides of the leg;
   wherein when the first latch projection is in engagement with the first catch, applying force to the drive member moves the drive member into the channel and the drive member pushes against the leg of the detent member to disengage the first latch projection from the first catch;
   wherein further movement of the drive member into the channel causes the latch portion of the detent member to slide toward the second wall against the plunger to a position where the second projection is aligned with the second catch;
   wherein when the force applied to the drive member is removed, the biasing member urges the plunger toward the first catch to a position where the second latch projection engages the second catch.

2. The latching motion transfer mechanism of claim 1 wherein force applied to the detent member through the plunger by the biasing member when the first latch projection is latched to the first catch causes the leg to pivot, toward the first wall of the channel and wherein force applied to the detent member by the drive member after the leg has pivoted toward the first wall causes the latch portion to slide across a surface of the plunger toward the second wall.

3. The latching motion transfer mechanism of claim 2 wherein force applied to the detent member through the plunger by the biasing member when the second latch projection is latched to the second catch causes the leg to pivot toward the second wall of the channel and wherein force applied to the detent member by the drive member after the leg has pivoted toward the second wall causes the latch portion to slide across a surface of the plunger toward the first wall.

4. The latching motion transfer mechanism of claim 1 wherein a first movement of the drive member in a first direction causes the detent member to latch with the second catch and a second movement of said drive member in said first direction causes the detent member to disengage from the second catch.

5. The latching motion transfer mechanism of claim 1 wherein the latching motion transfer mechanism is coupled to a second latching motion transfer mechanism by a linkage that limits movement of the plunger with respect to a plunger of latching motion transfer mechanism.

6. The latching motion transfer mechanism of claim 5 wherein the linkage resynchronizes said detent member and a detent member of the second latching motion transfer mechanism when one of the detent members is disengaged while the other detent member is engaged.

7. The latching motion transfer mechanism of claim 1 wherein the drive member is moved by a pin and follower arrangement.

8. The latching motion transfer mechanism of claim 1 further comprising a caster assembly connected to the frame and a foot connected to the plunger, wherein wheels of the caster assembly rest on a support surface and the foot is spaced apart from the support surface when the detent member is latched with the first catch, and wherein moving the drive member in a first direction to move the detent member to latch with the second catch causes the foot to engage the support surface and lift the castor off of the support surface.

9. The latching motion transfer mechanism of claim 8 wherein moving the drive member a second time in the first direction causes the detent member to disengage from the second catch member and lower the caster back onto the support surface upon release of the drive member.

10. The latching motion transfer mechanism of claim 9 wherein the detent member returns to engagement with the first catch when the drive member is released.

11. A latching motion transfer mechanism comprising:
    a frame with a channel;
    a first catch at a first position along the channel;
    a second catch across the channel from the first catch at a second position along the channel;
    a drive member;
    a detent member disposed in the channel including a leg and a latch portion having first and second latch projections;
    a biasing member;
    wherein when the first latch projection of the latch portion is in engagement with the first catch, applying force to the drive member moves the drive member into the channel and the drive member pushes against the leg of the detent member to disengage the first latch projection of the latch portion from the first catch;
    wherein further movement of the drive member into the channel causes the latch portion of the detent member to slide across the channel to a position where the second latch projection of the latch portion is aligned with the second catch;
    wherein when the force applied to the drive member is removed, the biasing member urges the latch portion toward the first catch to a position where the second latch projection of the latch portion engages the second catch.

12. The latching motion transfer mechanism of claim 11 wherein force is applied to the detent member through a plunger by the biasing member.

13. The latching motion transfer mechanism of claim 11 wherein force applied to the detent member through a plunger by the biasing member when the latch portion is latched to the first catch causes the leg to pivot across the channel toward the first catch and wherein force applied to the detent member by the drive member after the leg has pivoted toward the first catch causes the latch portion to slide across a surface of the plunger toward the second catch.

14. The latching motion transfer mechanism of claim 13 wherein force applied to the detent member through a plunger by the biasing member when the latch portion is latched to the second catch causes the leg to pivot across the channel toward the second catch and wherein force applied to the detent member by the drive member after the leg has pivoted toward the second catch causes the latch portion to slide across a surface of the plunger toward the first catch.

15. The latching motion transfer mechanism of claim 11 wherein a first movement of the drive member in a first direction causes the detent member to latch with the second catch and a second movement of said drive member in said first direction causes the detent member to disengage from the second catch.

16. The latching motion transfer mechanism of claim 11 wherein the latching motion transfer mechanism is coupled to a second latching motion transfer mechanism by a linkage that limits movement of the plunger with respect to a plunger of latching motion transfer mechanism.

17. The latching motion transfer mechanism of claim 16 wherein the linkage resynchronizes said detent member and a detent member of the second latching motion transfer mechanism when one of the detent members is disengaged while the other detent member is engaged.

18. The latching motion transfer mechanism of claim 11 wherein the drive member is moved by a pin and follower arrangement.

19. The latching motion transfer mechanism of claim 11 further comprising a caster assembly connected to the frame and a foot connected to the plunger, wherein wheels of the caster assembly rest on a support surface and the foot is spaced apart from the support surface when the detent member is latched with the first catch, and wherein moving the drive member in a first direction to move the detent member to latch with the second catch causes the foot to engage the support surface and lift the castor off of the support surface.

20. The latching motion transfer mechanism of claim 19 wherein moving the drive member a second time in the first direction causes the detent member to disengage from the second catch member and lower the caster back onto the support surface upon release of the drive member.

21. The latching motion transfer mechanism of claim 20 wherein the detent member returns to engagement with the first catch when the drive member is released.

22. The latching motion transfer mechanism of claim 11 wherein the channel is rectangular in cross section.

23. The latching motion transfer mechanism of claim 11 wherein the channel comprises first and second spaced apart side walls.

24. The latching motion transfer mechanism of claim 11 wherein the channel comprises first and second spaced apart parallel side walls.

* * * * *